(12) United States Patent
Tong et al.

(10) Patent No.: US 8,526,400 B2
(45) Date of Patent: Sep. 3, 2013

(54) RADIO ACCESS SYSTEM AND METHOD USING OFDM AND CDMA FOR BROADBAND DATA TRANSMISSION

(75) Inventors: Wen Tong, Ottawa (CA); Jianglei Ma, Kanata (CA); Hang Zhang, Napean (CA); Mo-Han Fong, L'Original (CA); Ming Jia, Ottawa (CA); Peiying Zhu, Kanata (CA); Geng Wu, Plano, TX (US); Jun Li, Richardson, TX (US); Dong-Sheng Yu, Ottawa (CA)

(73) Assignee: Apple Inc., Cupertino, CA (US)

( * ) Notice: Subject to any disclaimer, the term of this patent is extended or adjusted under 35 U.S.C. 154(b) by 483 days.

(21) Appl. No.: 11/816,370

(22) PCT Filed: Feb. 15, 2006

(86) PCT No.: PCT/CA2006/000225
§ 371 (c)(1),
(2), (4) Date: Aug. 15, 2007

(87) PCT Pub. No.: WO2006/086878
PCT Pub. Date: Aug. 24, 2006

(65) Prior Publication Data
US 2008/0151743 A1    Jun. 26, 2008

Related U.S. Application Data

(60) Provisional application No. 60/652,976, filed on Feb. 15, 2005, provisional application No. 60/683,131, filed on May 19, 2005, provisional application No. 60/687,412, filed on Jun. 3, 2005.

(51) Int. Cl.
*H04B 7/216* (2006.01)

(52) U.S. Cl.
USPC .......................................... 370/335; 370/208

(58) Field of Classification Search
USPC ...... 370/342, 335, 338, 350, 208; 455/432.1, 455/432.2, 442, 445
See application file for complete search history.

(56) References Cited

U.S. PATENT DOCUMENTS

| | | | |
|---|---|---|---|
| 6,130,886 A | | 10/2000 | Ketseoglou et al. |
| 2004/0264507 A1 | * | 12/2004 | Cho et al. ...................... 370/480 |
| 2004/0264558 A1 | * | 12/2004 | Chae et al. .................... 375/148 |
| 2005/0063345 A1 | * | 3/2005 | Wu et al. ....................... 370/335 |
| 2005/0207345 A1 | * | 9/2005 | Onggosanusi et al. ........ 370/236 |
| 2005/0249177 A1 | * | 11/2005 | Huo et al. ...................... 370/342 |
| 2006/0002361 A1 | * | 1/2006 | Webster et al. ............... 370/343 |
| 2006/0013182 A1 | * | 1/2006 | Balasubramanian et al. 370/343 |
| 2006/0050676 A1 | * | 3/2006 | Mansour ........................ 370/342 |
| 2006/0203924 A1 | * | 9/2006 | Casaccia et al. .............. 375/260 |

FOREIGN PATENT DOCUMENTS

WO    2004/057894 A1    7/2004

\* cited by examiner

*Primary Examiner* — Mark Rinehart
*Assistant Examiner* — Matthew Hopkins

(57) ABSTRACT

A method and system for wireless data communication using a first wireless communication technology and a second wireless communication technology. The second wireless communication technology being different from the first wireless communication technology. A transmitter is arranged to transmit data using frame structures based on the first wireless communication technology and the second wireless communication technology in which the frame structure based on the second wireless communication technology has a timing structure, MAC and pilot that are also used with the frame structure of the first wireless communication technology. The transmitter is arranged to selectively change transmission on a frame by frame basis between the first wireless communication technology and the second wireless communication technology.

32 Claims, 21 Drawing Sheets

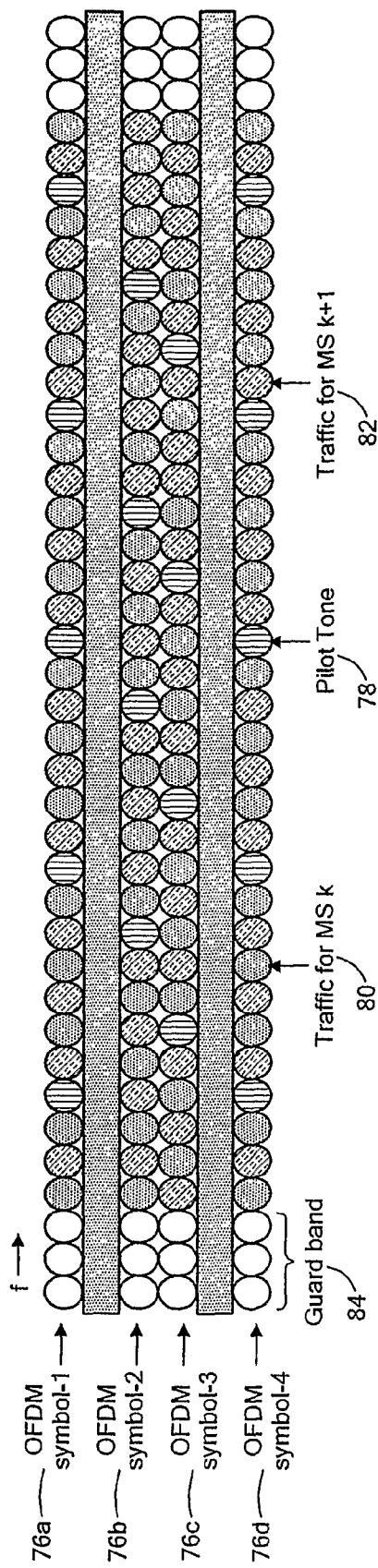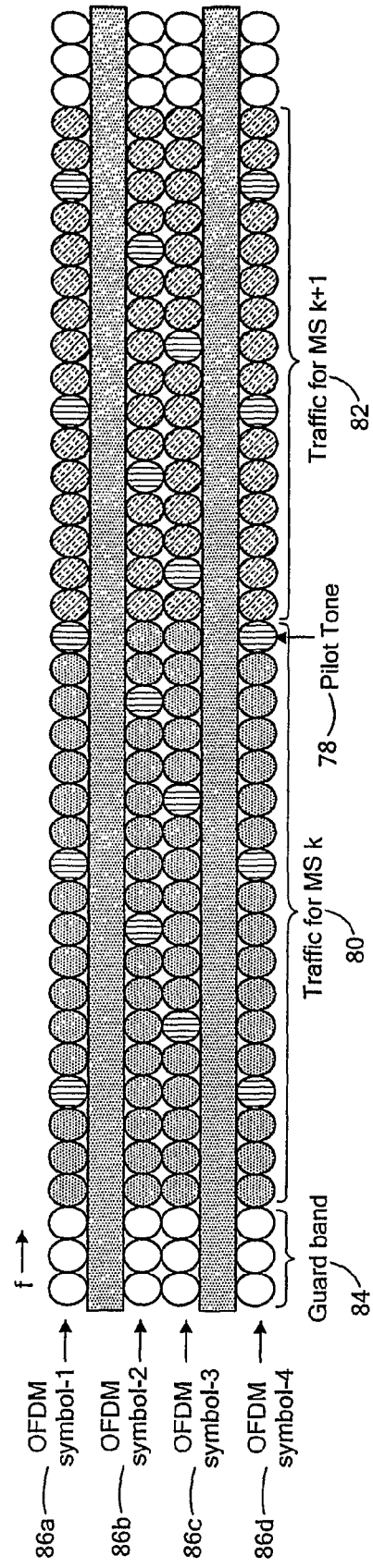

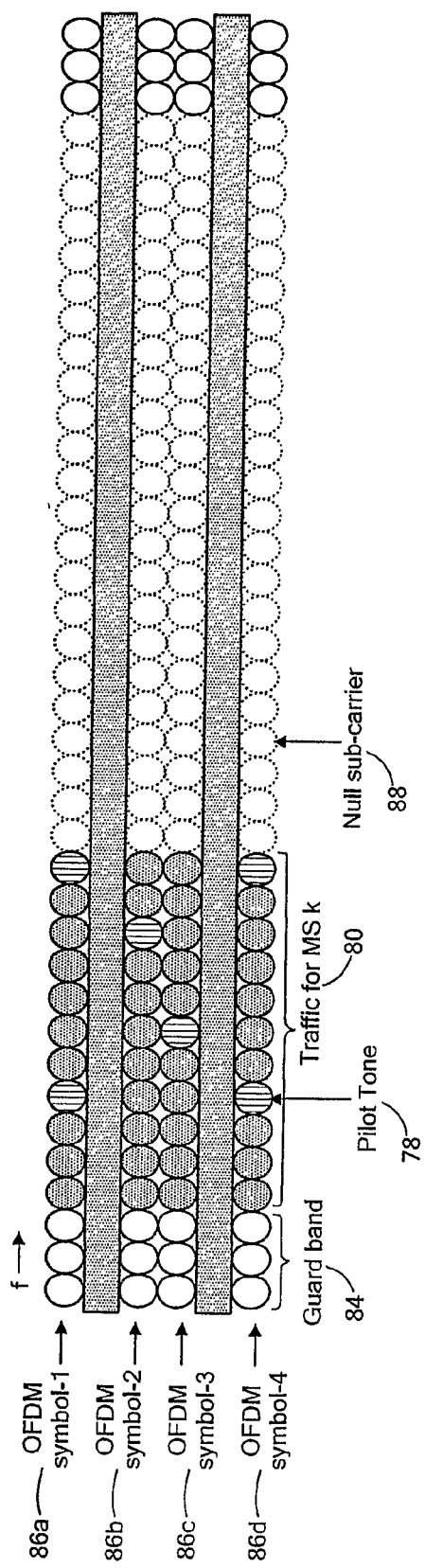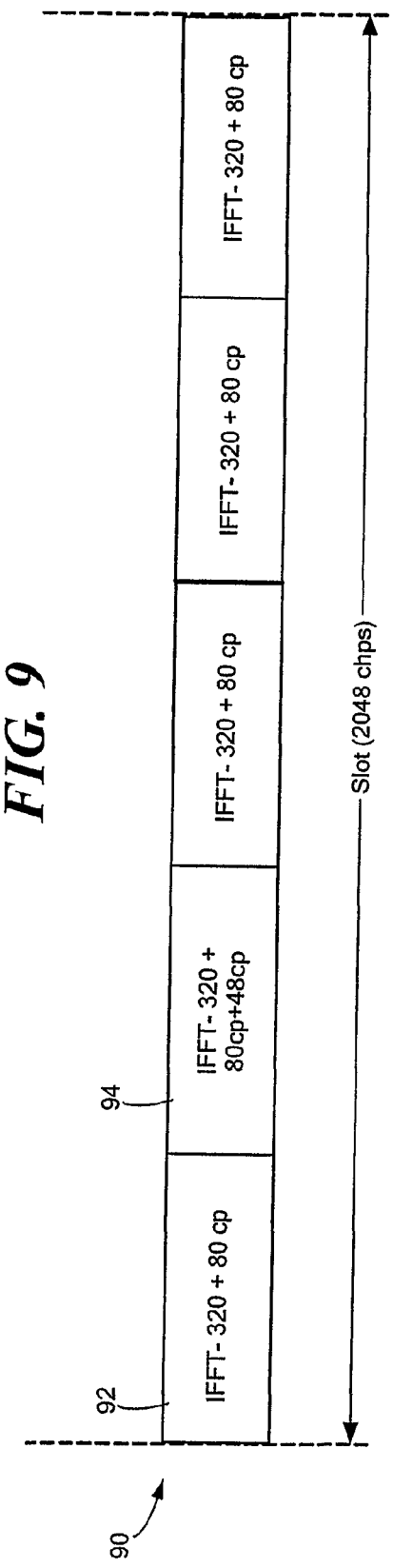
FIG. 9
FIG. 10

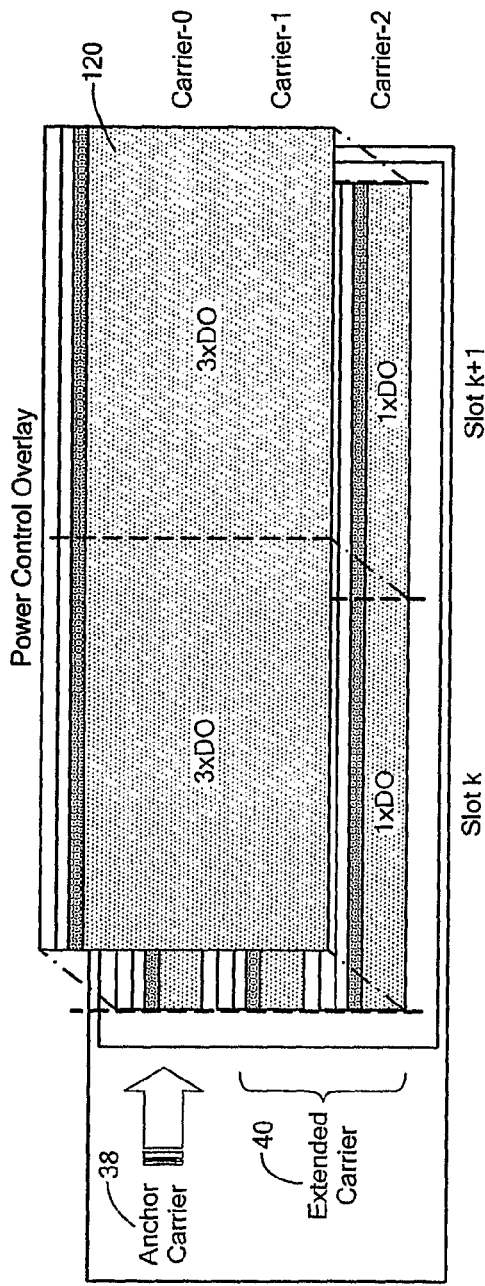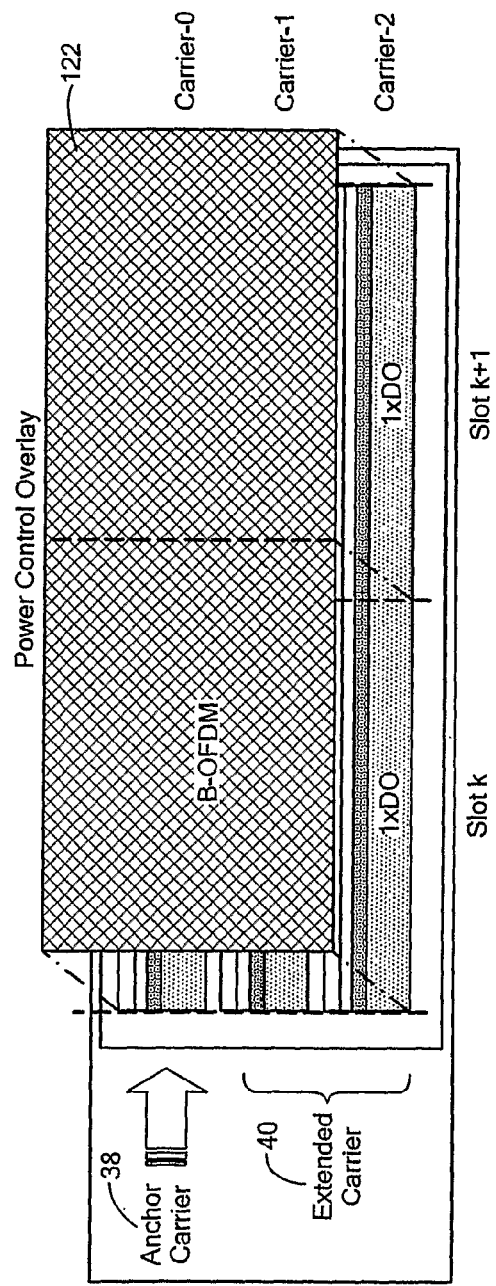
FIG. 20
FIG. 21

RADIO ACCESS SYSTEM AND METHOD USING OFDM AND CDMA FOR BROADBAND DATA TRANSMISSION

CROSS-REFERENCE TO RELATED APPLICATIONS

This application is a National Stage Application based on PCT Application Number PCT/CA2006/000225 filed Feb. 15, 2006, entitled RADIO ACCESS SYSTEM AND METHOD USING OFDM AND CDMA FOR BROADBAND DATA TRANSMISSION which is related to and claims priority to U.S. Provisional Application Ser. No. 60/652,976, filed Feb. 15, 2005, and U.S. Provisional Application Ser. No. 60/683,131, filed May 19, 2005, and U.S. Provisional Application Ser. No. 60/687,412, filed Jun. 3, 2005, the entirety of all of which are incorporated herein by reference.

STATEMENT REGARDING FEDERALLY SPONSORED RESEARCH OR DEVELOPMENT n/a

BACKGROUND OF THE INVENTION

1. Statement of the Technical Field

The present invention relates to the field of wireless communications and more particularly to a method and system for providing integration and a migration path between disparate wireless broadband systems in order to increase network capacity and performance.

2. Description of the Related Art

As the demand for high speed broadband networking over wireless communication links increases, so to does the demand placed on communication infrastructures. The result is that the capacities of even relatively new wireless communication technologies become quickly reached. Service providers have been deploying Evolution Data Only ("EV-DO") based systems, such as 1xEV-DO systems (also referred to herein as "1x-DO") to provide wireless broadband networking service to their customers. EV-DO systems are based on code division multiple access ("CDMA") technology used to provide cellular telephony services such as are specified in the CDMA2000 specification. CDMA2000 is a family of 3G mobile telecommunications standards that use CDMA, a multiple access scheme for digital radio, to send voice, data, and signaling data (such as a dialed telephone number) between mobile stations ("MS") and base stations.

In brief, CDMA communication allows many mobile stations and base stations to share the same frequency by encoding data with a pseudorandom noise code associated with an assigned channel. Typically, a system that operates within a 5 MHz frequency band can be divided into three 1.25 MHz carriers, into which the channels are allocated (the remaining 1.25 MHz of the frequency band is positioned between the carriers to allow for separation). CDMA systems that provide broadband data support may allocate one or more carriers to voice communications and the remainder to EV-DO communications.

Conceptual proposals have been made which propose the stacking of multiple EV-DO carriers to scale bandwidth. Carrier stacking is referred to as multi-carrier data only ("MC-DO"). However, these proposals fail to address integration with existing 1x-DO implementations or provide a migration path from these legacy installations to an MC-DO system. It is therefore desirable to have a method and system which provides a migration path from a 1x-DO system to an MC-DO system and which does not require customers to have to immediately replace 1x-DO MS hardware.

Whether 1x-DO or even MC-DO, EV-DO technology has limitations as compared with newer wireless broadband networking technologies such as broadband orthogonal frequency division multiplexing ("B-OFDM"). Like CDMA, OFDM is a technology that transmits multiple signals simultaneously over a single transmission path. Each signal travels within its own unique frequency range (sub-carrier), which is modulated by the data (text, voice, video, etc.).

OFDM uses a spread spectrum technique distributes the data over a large number of carriers that are spaced apart at precise frequencies. This spacing provides the "orthogonality" that prevents the demodulators from seeing frequencies other than their own. Unlike EV-DO systems, OFDM systems do not require a guard band between sub-carriers. The benefits of OFDM are high spectral efficiency, resiliency to RF interference, and lower multi-path distortion. This is useful because in a typical terrestrial broadcasting scenario there are multi-path-channels in which the transmitted signal arrives at the receiver using various paths of different length. Because multiple versions of the signal interfere with each other, referred to as inter symbol interference, it becomes very hard to extract the original information. OFDM reduces the effect of this distortion. B-OFDM is the use of OFDM for broadband data transmission.

As compared with EV-DO, OFDM systems offer greater channel capacities and performance. However, EV-DO and OFDM systems are incompatible. This presents a very large problem for service providers due to the huge cost of deploying a wireless broadband infrastructure, not to mention the extreme cost associated with licensing portions of the frequency spectrum from the government. While service providers who have deployed an EV-DO system may recognize the benefits of newer technologies such as B-OFDM, they may not be in position to simply discard the EV-DO system and install an OFDM-based system. In addition, because customers' mobile stations are currently designed to support one system or the other, it presents a marketing challenge to get customers to simply replace EV-DO mobile stations they may have recently purchased with mobile stations that can run on a different technology. It is desirable to have a method and system which provides a migration path from an EV-DO system (whether 1x-DO or MC-DO) to B-OFDM without the need to purchase licenses for additional spectrum.

Multiple Input, Multiple Output Orthogonal Frequency Division Multiplexing ("MIMO-OFDM") is an OFDM technology that uses multiple antennas to transmit and receive radio signals. MIMO-OFDM allows service providers to deploy wireless broadband systems that take advantage of the multi-path properties of environments using base station antennas that do not necessarily have line of sight communications with the MS.

MIMO systems use multiple antennas to simultaneously transmit data, in small pieces to the receiver, which processes the separate data transmissions and puts them back together. This process, called spatial multiplexing, can be used to proportionally boost the data-transmission speed by a factor equal to the number of transmitting antennas. In addition, since all data is transmitted both in the same frequency band and with separate spatial signatures, this technique utilizes spectrum very efficiently. It is therefore also desirable to have a method and system which provides a migration path from 1x-DO to MIMO-OFDM.

SUMMARY OF THE INVENTION

In accordance with one aspect, the present invention provides a method for communicating data in a wireless communication network that supports a first wireless communication technology and a second wireless communication technology in which the second wireless communication technology is different from the first wireless communication technology. Data is transmitted using frame structures based on the first wireless communication technology and the second wireless communication technology. The frame structure based on the second wireless communication technology has a timing structure, MAC and pilot that are also used with the frame structure of the first wireless communication technology. The data transmission is selectively changed on a frame by frame basis between the first wireless communication technology and the second wireless communication technology.

In accordance with another aspect, the present invention provides a system for wireless data communication using a first wireless communication technology and a second wireless communication technology. The second wireless communication technology is different from the first wireless communication technology. The system has a transmitter arranged to transmit data using frame structures based on the first wireless communication technology and the second wireless communication technology. The frame structure based on the second wireless communication technology has a timing structure, MAC and pilot that are also used with the frame structure of the first wireless communication technology. The transmitter is arranged to selectively change transmission on a frame by frame basis between the first wireless communication technology and the second wireless communication technology.

In accordance with still another aspect, the present invention provides a method for controlling transmission power to base stations in a wireless communication network. The wireless communication network supports a first wireless communication technology and a second wireless communication technology. The second wireless communication technology has a frame structure that is different from a frame structure of the first wireless communication technology. The frame structure of the first wireless communication technology is mapped into the frame structure of the second wireless communication technology. A reverse link pilot associated with the first wireless communication technology is mapped into a scatter pilot with power boost associated with the second wireless communication technology. Power transmission to base stations is controlled using the second wireless communication technology by using the mapped frame structure and scatter pilot with power boost.

In accordance with still another aspect, the present invention provides a method for providing burst transmissions to base stations in a wireless communication network having an anchor carrier and one or more extended carriers supporting a first wireless communication technology and a second wireless communication technology. Burst mode transmission is scheduled to devices using the second wireless communication technology on at least one extended carrier. The at least one extended carrier is used to transmit in burst mode based on the scheduling.

In accordance with yet another aspect, the present invention provides a method for providing reverse link MIMO-OFDM transmissions to base stations in a wireless communication network, in which a plurality of mobile stations are spatially separated. Different orthogonal B-OFDM pilots for transmissions associated with each of the plurality of mobile stations are assigned. Transmissions of the plurality of mobile stations to form a spatially multiplexed transmission signal on the reverse link are collaborated.

In accordance with another aspect, the present invention provides a method for a channel structure for reverse link wireless communications, in which dedicated pilot symbols are incorporated into a slot structure corresponding to a wireless communication technology. The dedicated pilot symbols are shared among a plurality of mobile stations in at least one of a time domain and frequency domain by interlacing pilot sub-carriers of different ones of the plurality of mobile stations within the same pilot symbol, the sub-carriers being associated with the wireless communication technology. The dedicated pilot symbols are used for at least one of reverse link channel soundings and power control.

In accordance with still yet another aspect, the present invention provides a method for managing interference on a reverse link of a wireless communication network, in which reverse link transmission power is controlled to manage interference. The reverse link transmission power is controlled using a dedicated channel within the wireless communication network.

In accordance with another aspect, the present invention provides a method for managing interference on a reverse link of a wireless communication network to achieve a desired signal-to-noise ratio, in which HARQ and slow power adjustment are used for adaptive data rate assignment to achieve the desired signal-to-noise ratio.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 7 is a diagram of a first embodiment of an OFDM frequency structure constructed in accordance with the principles of the present invention;

FIG. 8 is a diagram of a second embodiment of an OFDM frequency structure constructed in accordance with the principles of the present invention;

FIG. 9 is a diagram of a third embodiment of an OFDM frequency structure constructed in accordance with the principles of the present invention;

FIG. 10 is a diagram of a B-OFDM timeslot constructed in accordance with the principles of the present invention;

FIG. 20 is a power control overlay diagram for 1x-DO and MC-DO mobile stations;

FIG. 21 is a power control overlay diagram including B-OFDM power control.

DETAILED DESCRIPTION OF THE PREFERRED EMBODIMENTS

This application is related to U.S. Patent Application No. 60/652,976, filed Feb. 15, 2005, entitled BROADBAND DATA ONLY RADIO ACCESS SYSTEM SYING OFDM AND CDMA TRANSMISSION, U.S. Patent Application No. 60/683,131, filed May 19, 2005, entitled OFDM AIR INTERFACE, and U.S. Patent Application No. 60/687,412, filed Jun. 1, 2005, entitled OFDM AIR INTERFACE, the entirety of all of which are incorporated herein by reference.

Figure 1:
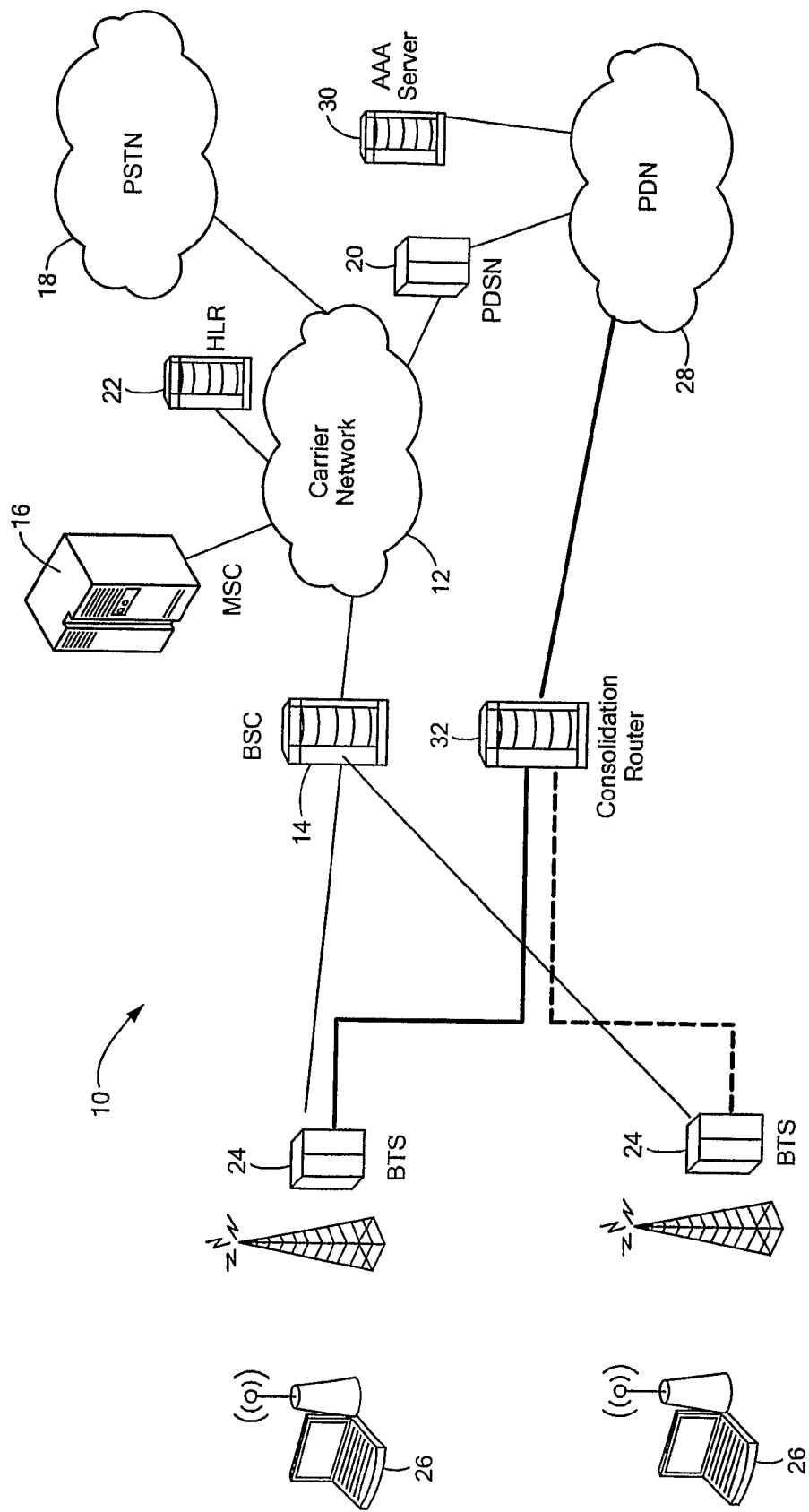
FIG. 1 is a diagram of a system constructed in accordance with the principles of the present invention.

Referring now to the drawing figures in which like reference designators refer to like elements, there is shown in FIG. 1, a system constructed in accordance with the principles of the present invention and designated generally as "10." System 10 includes hardware elements that may be found in a traditional EV-DO network such as an internal carrier network 12, to which is coupled base station controller ("BSC") 14, mobile switching center ("MSC") 16, public switched telephone network ("PSTN") 18, and packet data serving node ("PDSN") 20. System 10 also includes home location register ("HLR") 22 which communicates with MSC 16 and base transceiver stations ("BTS") 24 in communication with BSC 14. MS 26 engage in wireless broadband communication with BTSes 24. Carrier network 12 can be, for example, an internet protocol ("IP") network.

System 10 further includes elements included in the flat packet data network of system 10 such as packet data network ("PDN") 28 to which is coupled authentication, authorization and accounting server ("AAA") 30, PDSN 20 and consolidation router 32. Consolidation router 32 is in data communication with BTSes 24 and can be any IP router as is known in the art. Unless mention is made to the contrary, the hardware components of the elements shown in FIG. 1 can be any hardware known in the art that is suitable for implementing the functions and aspects of the present invention described herein. For example, the hardware in elements such as BSC 14, MSC 16, HLR 22 and AAA 30 are known as are the basic functions provided by these elements.

BSC 14 provides call control and serves and the interface between BTSes 24 and carrier IP network 12. Among other things, MSC 16 controls BSCs 14, assigns network resources, etc. HLR 22 provides mobility management to customers and their MSes as is known in the art. AAA 30 manages authentication, authorization and accounting for customers' use of packet data services. Functions of the present invention that have been added to these elements are described herein.

General Overview

The present invention provides a staged approach for seamless and scalable evolution from wireless communication technologies such as 1x-DO systems to MC-DO, B-OFDM, and MIMO-OFDM systems as well as mixed systems such as MC-DO with B-OFDM. Evolution to these systems and the methodology for accomplishing the same is described below in detail. Advantageously, evolution to MC-DO systems allows multi-carrier stacking to scale the available bandwidth within the system and, because MC-DO systems are fundamentally based on 1x-DO technology, the evolution can proceed quickly and smoothly. With respect to evolution to B-OFDM systems, the present invention provides an incremental introduction to OFDM signaling in a manner which allows an evolution toward OFDM technology. As is discussed below, the B-OFDM integration method of the present invention is backward compatible and can overlay with 1x-DO and MC-DO systems, thereby allowing service providers to protect the investments made in 1x-DO and MC-DO technology. This can be accomplished by the phased introduction of new mobile stations 26 and an upgrade of the channel element card in BTSes 24. Similarly, migration to a MIMO-OFDM environment can be accomplished by allowing cell sites to evolve to multiple radios and antennas and doing the same with mobile stations 26.

The present invention provides for scalable scenarios for migrating from 1x-DO technology to MC-DO, B-OFDM, MIMO-OFDM, and MC-DO/B-OFDM mixed environments. Each is discussed generally in this section.

1x-DO migration to MC-DO is an expansion which provides no additional gain for broadband scaling. In other words, there is a linear scaling gain associated with the aggregation of multiple carriers. An additional mobile station hardware or software release is required to implement the functions of the present invention so that the mobile stations can support MC-DO.

MC-DO is explained with reference to FIG. 2. MC-DO is a multi-carrier arrangement which scales in frequency by using multiple carriers to allow for extended bandwidth capability. In the forward link ("FL") from BTS 24 to MS 26, an anchor carrier 34 is used in conjunction with one or more extended carriers 36. Similarly, in the reverse link ("RL") from MS 26 to BTS 24, MC-DO provides an anchor carrier 38 and one or more extended carriers 40. By way of non-limiting example, FIG. 2, as well as other Figures and descriptions below, show the use of an anchor carrier and two extended carriers, it being understood that more or fewer extended carriers can be used.

Migration from a 1x-DO system to a B-OFDM system requires two distinct types of mobile stations, namely mobile stations 26 that support the legacy 1x-DO technology and new mobile stations 26 that can support the B-OFDM technology. By migrating to B-OFDM, there is an increase in the scalability of the system. There is also a performance gain associated with the use of a broadband system such as B-OFDM. Finally, the migration to B-OFDM provides a direct path to MIMO-OFDM if the service provider had first decided to implement a B-OFDM system. Migrating from 1x-DO to a mixed MC-DO/B-OFDM environment may occur where a service provider having a 1x-DO system has opted to upgrade to MC-DO but determines that B-OFDM is the next step in the technology implementation. Such may be the case because, while MC-DO is superior to 1x-DO, the performance benefit, i.e., signal to noise ratio, gain and capacity, associated with MC-DO is not as good as with B-OFDM systems. However, operating in a hybrid environment requires a dual-mode MS 26 that can operate in both the MC-DO and the B-OFDM environments because MS 26 has to demodulate the 1x-DO MAC and pilot, and also demodulate the B-OFDM signal.

As with migrating from 1x-DO to B-OFDM, migration from 1x-DO to MIMO-OFDM requires that the system support distinct mobile stations 26 for support legacy 1x-DO and new B-OFDM technology. It is noted that single input/single output ("SISO") and MIMO modes can coexist on the network based on scheduling. Such an arrangement is described below in detail.

In sum, four (4) possible types of MS 26 classes can be supported using the present invention. These are 1x-DO, MC-DO, B-OFDM mobile stations 26, and mobile stations 26 which support both MC-DO and B-OFDM. In addition, it is contemplated that both voice and real time data services can be supported in both OFDM modes and MC-DO modes.

It is noted that the present invention results in an integer relationship between the B-OFDM sampling rate and the 1x-DO chip rate. However, unique clocks for both B-OFDM operation and 1x-DO operation can be used. As is discussed below, MIMO channel estimation can be determined using frequency domain scattered auxiliary pilots or TDM auxiliary pilot symbols. Similarly, the frequency domain scattered auxiliary pilots or TDM auxiliary pilot symbols can be used to assist the space division multiple access ("SDMA") channel estimation. Time domain auxiliary pilots may be used to assist MIMO-OFDM channel estimation and SDMA channel estimation.

Because the present invention provides a dynamic multi-carrier bandwidth sharing scheme, the entirety of available bandwidth may be shared between 1x-DO operation, MC-DO operation and B-OFDM operation. Within the entirety of the available bandwidth, 1x-DO and MC-DO operation can occupy one or more carriers, each of which is 1.25 MHz. Of course, other carrier bandwidths are possible. The remaining available bandwidth is used for B-OFDM transmission. The segments of bandwidth used by each of 1xEV-DO, MC-DO and B-OFDM can be either contiguous or fragmented. There are two possible embodiments for B-OFDM transmission.

For the first embodiment, the B-OFDM sampling frequency and FFT size are based on the entirety of the available bandwidth. The actual sub-carriers used for B-OFDM transmission are those located in the remaining available bandwidth. For example, 5 MHz total bandwidth can be divided into three 1.25 MHz sub-carriers. Incidentally, the guard band between the carriers assigned for OFDM transmission can be removed if the bandwidth sharing schemes are identical among neighboring cells. The present invention therefore provides a flexible system which maximizes bandwidth scalability. For the second scenario, the entirety of the available bandwidth is divided into carrier units of 1.25 MHz. For those carriers that are remaining for B-OFDM transmission, each carrier will form an independent B-OFDM waveform, i.e. the B-OFDM sampling frequency and FFT size are based on the 1.25 MHz bandwidth. Multiple carriers B-OFDM (or MC-OFDM) transmission will be performed on those remaining carriers.

Forward Link Operation

For ease of understanding and simplicity of explanation, the present invention is described with respect to forward link communications for each of the above-described migration methodologies and then the reverse link communication is described with respect to each of the above four methodologies.

MC-DO

Figure 2:
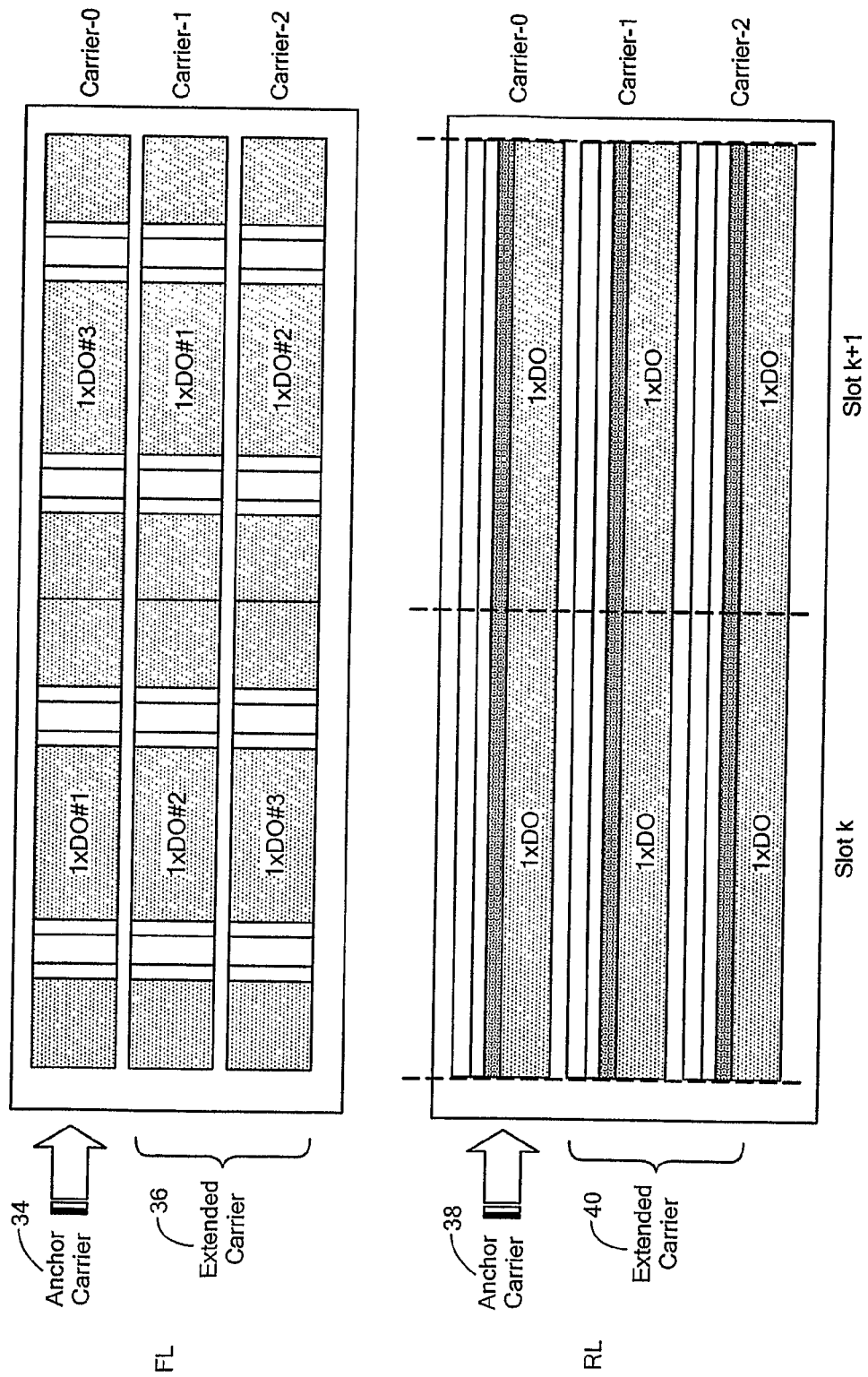
FIG. 2 is a diagram showing a carrier arrangement for MC-DO operation.
Figure 3:
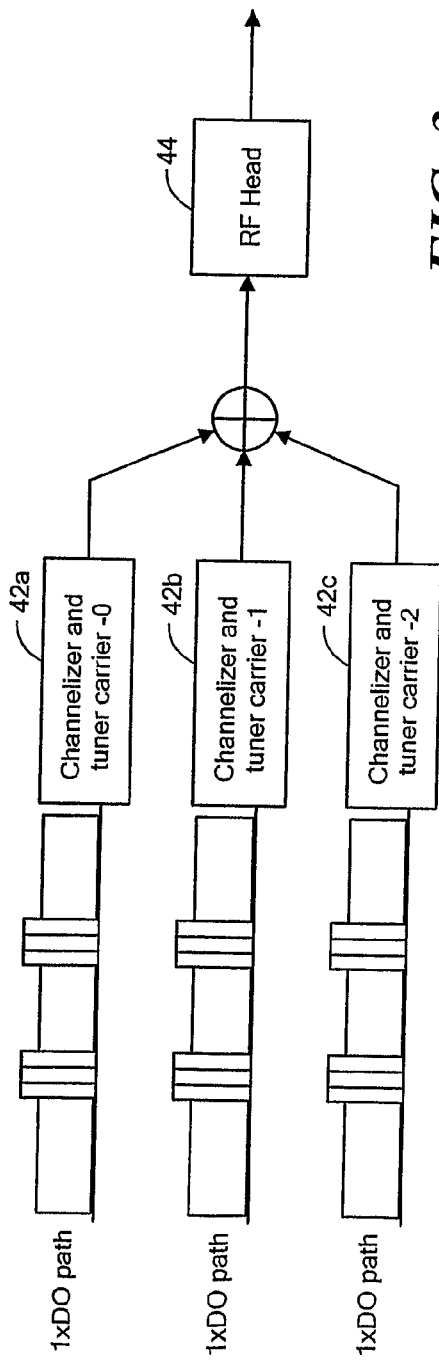
FIG. 3 is a block diagram of a BTS architecture used for 1x-DO and MC-DO forward link transmission.
Figure 4:
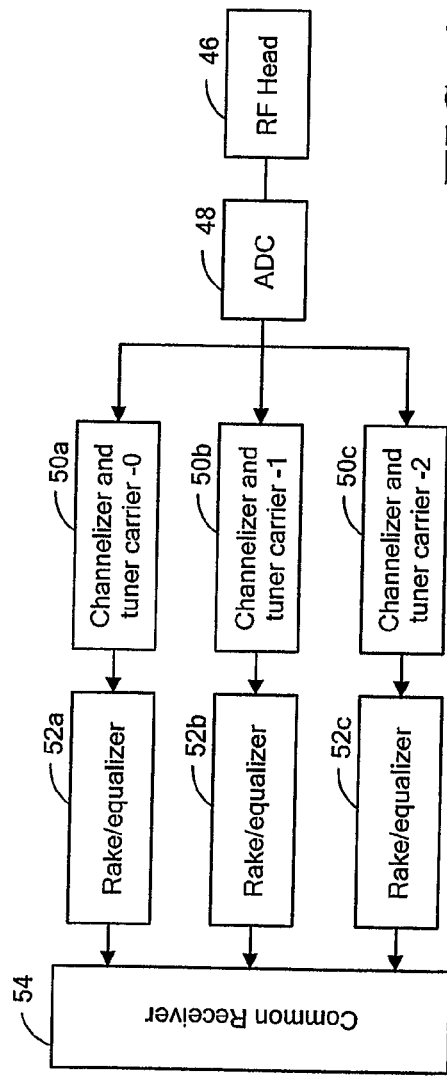
FIG. 4 is a block diagram of a mobile station architecture used for 1x-DO and MC-DO forward link reception.

As is shown in FIG. 2, MC-DO involves the use of an anchor carrier and one or more extended carriers. Of note, the extended carriers need not occupy contiguous frequency bands and need not be of contiguous frequency with the anchor carrier. FIGS. 3 and 4 show block diagrams of the components of BTS 24 and MS 26 used to support forward link MC-DO communications of the present invention. In particular, FIG. 3 shows a block diagram of the components of BTS 24 used to support MC-DO in accordance with the present invention. Initially, it is noted that the terms DOrA, 1x-DO and 1x-DO/DOrA are all used interchangeably herein. FIG. 3 shows signal paths for the anchor carrier (carrier-0) and two extended carriers, carrier-1 and carrier-2. For forward link communications, the bit stream to be transmitted on each carrier is processed by a respective channelizer and tuner module 42*a*, 42*b* or 42*c*, summed and transmitted by RF head 44. At MS 26, RF head 44 receives the transmitted MC-DO signal and provides the signal to analog to digital converter ("ADC") 48 which, in turn, provides the digital signal to a channelizer and tuner for each respective carrier, for example, channelizer and tuners 50*a*, 50*b*, and 50*c* corresponding to carrier-0, carrier-1, and carrier-2, respectively. The channelized signal corresponding to each carrier is then sent to a corresponding rake/equalizer 52*a*, 52*b*, or 52*c*. Once processed and equalized, common receiver 54 recovers the resultant data stream. Methods for equalizing, channelizing and tuning are known in the art and are not described herein.

By scaling in frequency from 1x-DO to MC-DO, the anchor carrier, such as anchor carrier 34 in FIG. 2, can be used for system acquisition, control signaling and voice over internet protocol ("VoIP") for 1x-DO implementations. In addition, the anchor carrier can be used to support legacy 1x-DO MS 26 users. The extended carriers, such as extended carriers 36 in FIG. 2, can be used for forward link content delivery using MC-DO, VoIP over MC-DO, and 1x-DO unicasting with scheduled carrier hopping between the extended and/or anchor carriers. Extended carriers 36 can also be used for multicasting on a broadcast/multicast-based system ("BC-MCS") with deterministic carrier hopping. By way of example, extended carriers 36 provided in accordance with the principles of the present invention can use a 1.67 millisecond sub-frame time division multiplex ("TDM") structure.

Advantageously, extended carriers 36 are scalable as a function of the 1x-DO receiver front-end technology and as access to new spectrum is made available. Put another way as MS 26 receiver technology develops, the use and quantity of extended carriers 36 that can be supported will scale. This, of course, assumes that new spectrum for extended carriers 36 is made available. As noted above, MC-DO in accordance with the present invention can support both contiguous and non-contiguous carrier allocations within the frequency spectrum for anchor carriers 34 and extended carriers 36.

It is also noted that the migration from 1x-DO to MC-DO provides an arrangement under which the bandwidth scales as demanded by the particular supported application. This can be done using a carrier assignment principle for the forward link and a bandwidth assignment principle for the reverse link, the latter of which is discussed below with respect to reverse link communications for MC-DO. With respect to the carrier assignment principle for the forward link, the use and assignment of bandwidth can be done on a per service or per session basis by bundling/grouping carriers such as anchor carrier 34 and/or extended carriers 36. In addition, bandwidth can be provided on a per timeslot basis based on scheduling and allocation within particular carriers. By providing mobile stations 26 which allow for scaling based on carrier and bandwidth, all combinations for scaling, e.g., per timeslot, per service, or per session, for MC-DO terminals can be provided. Legacy 1x-DO mobile stations 26 can only have services and slots allocated on anchor carrier 34. Carrier/bandwidth allocation and scaling is made based on network capacity, learned experience with particular mobile stations 26, quality of service ("QoS") requirements and load balancing.

Figure 5:
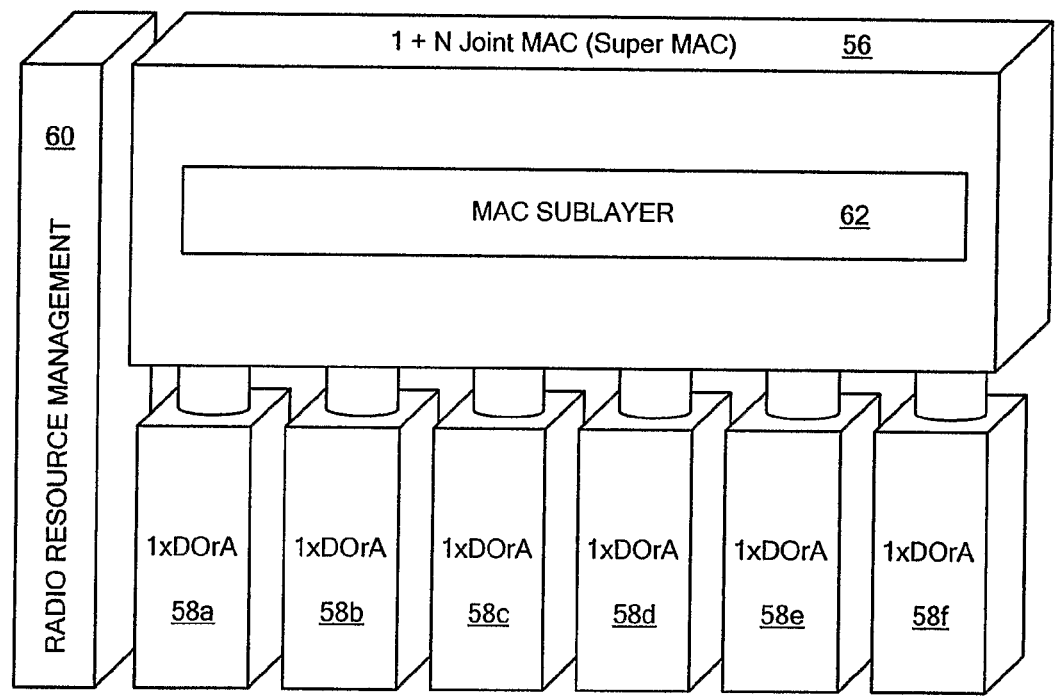
FIG. 5 is a diagram of a structure of a 1 +N Super MAC supporting six separate 1x-DO.

Because MC-DO involves the aggregation of a plurality of carriers, the use of a joint or "super" MAC allows further efficiencies over the use of separate 1x-DO carriers. Explanation of these improved efficiencies is made with reference to FIG. 5 which shows the general structure of a 1+N Super MAC supporting six separate 1x-DO carriers 58a, 58b, 58c, 58d, 58e, 58f (referred to collectively as "carriers 58"). While super MAC 56 is used across all carriers 58, radio resource management overlays the entirety of this arrangement to provide management of the entire transmission structure. Within super MAC 56 is MAC sublayer 62. MAC sublayer 62 handles, among other things, multiplexing functions.

Improved efficiencies for use of a super MAC 56 can be achieved as a result of diversity gains in the frequency domain under which the BTS 24 can choose a carrier and change that carrier if link transmission quality is not good. In addition, BTS 24 can choose a carrier and assign it to a MS 26 on both a timeslot basis and carrier basis to provide increased scheduling gains. The use of a super MAC also allows a reduction in control overhead and provides increased dimensionality with respect to the use of different frequency bands, i.e., carriers, for QoS management. The use of a common multiplexing layer within MAC sublayer 62 is used across carriers 58 to perform MC-DO multi-carrier scheduling, MC-DO MCS selection, MC-DO hybrid ARQ ("HARQ"). In addition, a common multiplexing layer can be used to support 1x-DO scheduling, 1x-DO MCS selection and 1x-DO HARQ so that support for 1x-DO carriers can be handled on an individual basis for support of legacy MS 26 devices.

The MC-DO operational mode of the present invention also supports channel quality indicator ("CQI") feedback and adaptive modulation/coding. Such can be accomplished by the use of a forward traffic channel ("FTC") for each carrier within the MC-DO system to support MC-DO scheduling. While in an active state, each MS 26 within the MC-DO system monitors its MAC ID on the MAC channel of each MC-DO carrier. It is contemplated that the MAC ID pool can be reused between 1x-DO and MC-DO supporting mobile stations 26. Under this arrangement, MS 26 estimates the carrier-to-interference ("C/I") ratio of the forward link of each individual carrier and informs BTS 24 using a multi-carrier CQI feedback channel, the data rate control channel ("DRC") on the reverse link. Depending on the type of MS 26, the DRC channel (referred to as "DRC-MC" within the multi-carrier environment) can be 1x or 3x spreading, depending on whether the mobile station supports 1x-DO or MC-DO. A Walsh Cover on the DRC-MC is used to identify the strongest sector. Alternatively, a separate sector indication channel, referred to as a Data Source Channel ("DSC"), can be used to indicate the strongest sector selected by MS 26.

At each timeslot, BTS 24 determines the available carriers for scheduling and slot size, modulation type and data rate for each data transmission on the FTC of each carrier. By way of example, such scheduling can be done every 1.67 milliseconds. For each carrier, each assignment has the same set of configurations as used within 1x-DO, such as fixed slot size, different types of modulation, different encoder packet size, and different data rates.

The MC-DO arrangement of the present invention also supports cell/sector selection and DRC feedback. In this arrangement, MS 26 determines both the sector and the data rate it wants. The mobile stations supporting MC-DO should receive all of the carriers from the same sector and should have the same DRC cover or DSC on all carriers. Two configurations are contemplated. The first is to separate the DRC cover/DSC and DRC value, and transmit the DRC cover or DSC on only one carrier since the DRC cover or DSC would be the same for all carriers within the MC-DO carrier grouping. In the alternative, the same structure as 1x-DO can be maintained which means that MS 26 has the DRC cover and DSC for all carriers, but BTS 24 can set an attribute to mandate that the mobile stations 26 indicate the same sector across carriers within the MC-DO environment. MS 26 can use its own selection algorithm to determine the sector. However, BTS 24 can set an attribute to determine whether the selection should be based on the strongest carrier or on combined carrier strength.

HARQ support within an MC-DO environment of the present invention is arranged so that the HARQ sub-packer generation scheme is the same as in 1x-DO. The initial transmission and subsequent retransmissions can be scheduled on different carriers via different scheduling instances. An acknowledgement for each carrier supported by an MC-DO MS 26 is sent by mobile station 26 corresponding to the carrier in which the data is transmitted. In other words, the present invention provides a new ACKC for each carrier to send an acknowledgement/no acknowledgement ("ACK/NAK") corresponding to the carrier where the data is transmitted.

B-OFDM

In order to provide a migration path from 1x-DO to B-OFDM, the present invention provides a scalable OFDM mode which supports such a migration. The B-OFDM mode of the present invention implements the same timing structure as 1x-DO, provides several frequency domain mapping modes, and can be combined with a 1x-DO pilot/MAC. These features are discussed below in detail. In addition, the present invention provides a B-OFDM-specific slot structure which implements an auxiliary pilot and auxiliary MAC channel, and supports an extended B-OFDM symbol. This arrangement allows the B-OFDM of the present invention to support bandwidth scalability, as well as the introduction and implementation of MIMO-OFDM.

Figure 6:
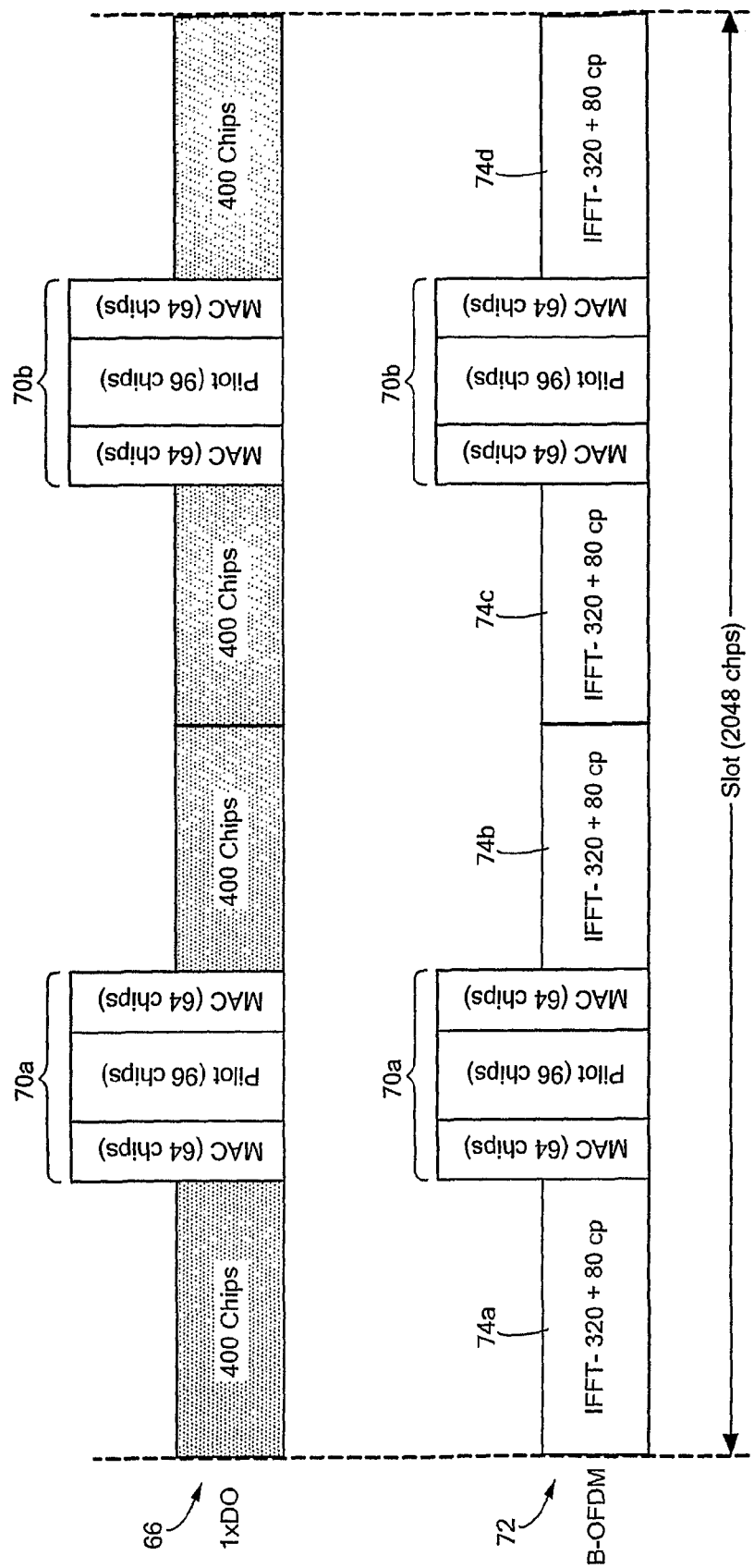
FIG. 6 is a diagram showing a B-OFDM time structure provided in accordance with the principles of the present invention in which the timeslot is used to support both 1x-DO and B-OFDM.

In order to support the migration from 1x-DO to B-OFDM, a physical layer frame structure in both the time and frequency domains is provided by the present invention and explained with reference to FIGS. 6-10. FIG. 6 is a diagram showing a B-OFDM time structure provided in accordance with the principles of the present invention in which the timeslot is used to support both 1x-DO and B-OFDM. In order to support 1x-DO legacy MS 26 devices, the 1x-DO time structure is arranged to provide pairs of data blocks, shown as 400 chip blocks 68a and 68b, and 68c and 68d, which sandwich pilot/MAC blocks 70a and 70b, respectively (pilot/MAC blocks 70a and 70b are collectively referred to as pilot/MAC blocks 70). This arrangement can be mapped into a B-OFDM environment while preserving the pilot/MAC arrangement of 1x-DO. Such an example is shown by B-OFDM time structure 72. As is seen, pilot/MAC blocks 70a and 70b are preserved, while data blocks 68a-68d are replaced by B-OFDM blocks 74a-74d, respectively. Each of blocks 74a-74d provide an IFFT and a cyclic prefix.

Using the examples shown in FIG. 6, the 400 chip blocks 68a-d for 1x-DO time structure 66 are replaced by 320 chip IFFT and an 80 chip cyclic prefix block 74a-d within B-OFDM time structure 72. This advantageously allows the reuse of the 1x-DO pilot within the B-OFDM environment, but, as described below, also allows the use of an auxiliary and scattered pilot in the B-OFDM environment. The B-OFDM physical layer also provides for prefix and postfix, whether as a smart prefix, zero prefix, or cyclic prefix. Synchronization is based on the 1x-DO pilot so that 1x-DO mobile stations 26 and B-OFDM mobile stations 26 can be supported. Channel estimation can be accomplished using the 1x-DO pilot and/or the B-OFDM pilot. The 320 point IFFT provides a combined 64 point FFT.

In accordance with another embodiment of a B-OFDM time structure constructed in accordance with the principles of the present invention, it is contemplated that each 400 chips in the 1x-DO timeslot can correspond to one or more OFDM symbols. Using 5 MHz bandwidth as an example, a 1.2288 MHz CDMA chip rate provides an OFDM sampling frequency of 7.3728 MHz (6x the CDMA chip rate).

Four different embodiments of B-OFDM frequency structures arranged in accordance with the principles of the present invention are described with reference to FIGS. 7-9. FIG. 7 shows a first embodiment of an OFDM frequency structure which provides a diverse multi-user frame. In this embodiment, multiple mobile stations 26 share the same timeslot by being assigned different tones in the frequency domain. The tones assigned to each mobile station 26 are distributed across the frequency band. Of note, in FIGS. 7-9, individual tones are represented by circles, and increasing frequencies shown from left to right within each diagram. In FIG. 7, four OFDM symbols, each of which supports multiple mobile stations 26, are shown as symbols 76a, 76b, 76c, and 76d (referred to collectively as symbols 76). Pilot tones 78, which are distributed within each symbol and across the frequency band are shown as tones with vertical stripes. Traffic for a mobile station, mobile station k, is shown as shaded tones 80, while traffic for a different mobile station is shown with diagonal stripes. Guard band 84 is shown as a grouping of unfilled tones.

In accordance with another embodiment, the B-OFDM frequency structure is arranged as a sub-band multi-user frame in which tones assigned to each mobile station 26 are contiguous in the frequency domain. As is shown in FIG. 8, using the four symbol example with symbols 86a, 86b, 86c, and 86d (referred to collectively as symbols 86), traffic for mobile station k 80, shown as the shaded tones, are all contiguous in the frequency domain with the exception of pilot tones 78 interspersed therein. Similarly, traffic for mobile station k+1 82, shown as the diagonally striped tones, is contiguous within each frequency band. As a third embodiment, a single mobile station frame based on B-OFDM is provided. Under this arrangement, other than pilot tones, all tones are assigned to one mobile station for a give timeslot. A fourth embodiment of a frequency structure, shown in FIG. 9, provides OFDM fractional reuse in which only part of the available data tones in the frequency band are assigned to one or more mobile stations 26 in a given timeslot. In this arrangement, there are null sub-carriers, shown as null sub-carriers 88, beyond a particular frequency range. The null sub-carriers can also be provided at the front edge of the frequency band or interspersed within the frequency band. Similarly, although FIG. 9 shows fractional reuse for an embodiment in which all available tones in the timeslot are assigned to a single mobile station 26, such an arrangement is readily extended to the embodiment shown in FIG. 8 in which traffic for multiple mobile stations 26 are provided along only a portion of the frequency band.

The present invention provides for bandwidth scalability within the B-OFDM environment. Using fixed sub-carrier spacing, cyclic prefix and a timing structure which are the same as with 1x-DO, bandwidth can readily be scaled. For example, using a 1.25 MHz sub-carrier, a 320 point IFFT can be provided. Using a 2.5 MHz sub-carrier, a 640 point IFFT is provided. By analogy, a 5 MHz sub-carrier provides a 1,280 point IFFT, a 10 MHz sub-carrier results in a 2,560 point IFFT, and a 20 MHz fixed sub-carrier provides a 5,120 point IFFT.

In the alternative, a fixed IFFT size cyclic prefix and time structure, which is the same as the underlying 1x-DO environment, can be used. For example, a 320 point IFFT can be provided through the use of a 1.25 MHz sub-carrier or a 2.5 MHz sub-carrier in which the 320 point IFFT is derived based on a 2x sampling rate and twice the sub-carrier spacing. A 1,280 point IFFT can be provided by a 5 or 10 MHz sub-carrier in which the 10 MHz sub-carrier leads to the 1,280 point IFFT via 2x sampling rate and twice the sub-carrier spacing.

As still another alternative, the FFT can be adjusted where the carrier spacing is fixed. For example, a 1.25 MHz sub-carrier provides a 256.FFT, a 2.5 MHz sub-carrier provides a 512.FFT, a 5.0 MHz sub-carrier provides a 1,024.FFT, and a 10 MHz sub-carrier provides a 2,048.FFT. The sampling frequency also scales linearly as in the case of the FFT size.

As is noted above, an advantage of the present invention is that migration from 1x-DO uses the 1x-DO MAC and pilot within the frame structure of the B-OFDM frame. Such an arrangement is shown in FIG. 6 with respect to the B-OFDM timeslot 72 arrangement. In operation, a B-OFDM MS 26 searches for a 1x-DO pilot. The B-OFDM mobile station 26 demodulates the MAC channel, shown as blocks 70a and 70b in FIG. 6. However, because the B-OFDM blocks, shown as blocks 74a-74d in FIG. 6 themselves contain auxiliary pilots, the auxiliary pilots can be reused as auxiliary MAC channels. B-OFDM blocks can also contain independent auxiliary MAC channels. Use of the auxiliary B-OFDM pilots as auxiliary MAC channels or independent auxiliary MAC channels can then be used for B-OFDM-specific scheduling.

As another embodiment, the present invention provides further migration toward B-OFDM in conjunction with the use of a B-OFDM MAC and pilot. This arrangement is described with reference to FIG. 10. A timeslot 90 is shown which provides a B-OFDM MAC and pilot. This can be accomplished by following a 1x-DO timing structure on the first OFDM block, e.g., OFDM block 92. An extended symbol having an extended 48-chip cyclic prefix is provided at the next block and shown as extended symbol block 94. The extended symbol can be used as a control channel/map for scheduling, a mid-amble, used for a B-OFDM-only cell search, and/or used for data traffic. The scattered pilot on each OFDM symbol should be enabled. Of note, the four frequency domain structure embodiments described above with reference to FIGS. 7-9 are applicable to the embodiment which provides the extended B-OFDM symbol.

Because the pilot and MAC are removed, another embodiment provides a timeslot that includes 10 OFDM symbols. Because the pilot and MAC 70, as shown in FIG. 6 are not used, even-sized OFDM symbols can be used in each slot. For example, a 5 MHz carrier with an FFT size of 1,024 can include 10 OFDM symbols per slot. Similarly, a 5 MHz carrier with an FFT size of 512 can include 20 OFDM symbols per slot. Although such is discussed with respect to the forward link, it is understood that the same scalability of OFDM parameters applies to the reverse link.

OFDM-MIMO

The present invention provides two frame-structure transmission approaches with respect to forward link operation of MIMO-OFDM. First, the time domain 1x-DO MAC/pilot structure can be used. This arrangement allows the use of a MIMO-OFDM mobile station 26 in a 1x-DO legacy environment as is described above with respect to B-OFDM. Second, the use of auxiliary MAC and pilot in the frequency domain, as with B-OFDM, can be used by mobile stations 26 that support OFDM.

Figure 11:
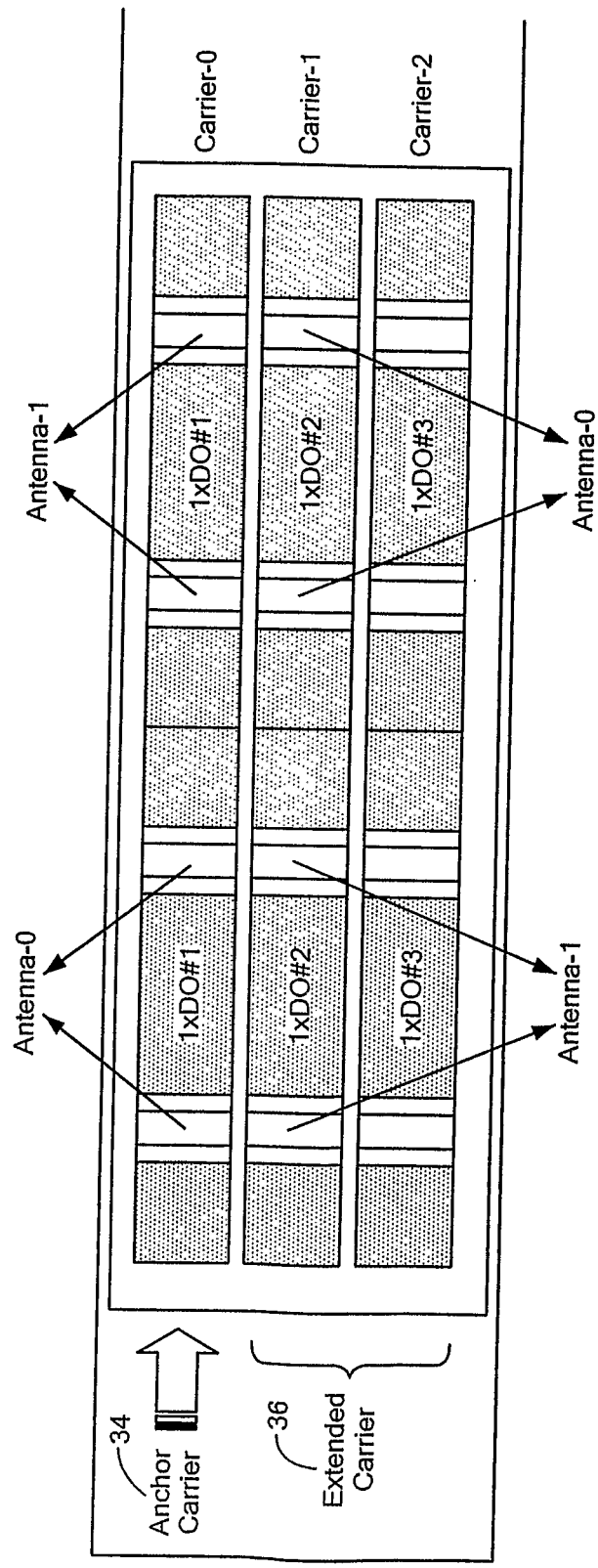
FIG. 11 is a diagram of a carrier arrangement supporting MIMO-OFDM which uses a 1x-DO MAC and pilot.

The present invention also provides two MIMO-OFDM traffic data transmission arrangements. First, if in the time domain, the MIMO-OFDM migration can be facilitated by use of the time domain 1x-DO forward traffic channel for 1x-DO and MC-DO arrangements. Second, MIMO-OFDM can use the same frequency domain forward traffic channel as with B-OFDM, both of which are described above. The use of MIMO in a 1x-DO environment and its application to the MC-DO environment are explained with reference to FIG. 11. Recall that the forward link for an MC-DO environment was explained with reference to anchor carrier 34 and extended carrier 36 in FIG. 2. In the MIMO environment, multiple antennas are used to transmit the forward link signal to a MIMO-compatible MS 26. A two antennas arrangement is shown in FIG. 11, it being understood that the present invention is not limited to such. As shown in FIG. 11, space time spreading ("STS") is used to transmit the MAC in which both antenna 0 and antenna 1 transmit the same MAC. However, antenna switching is used to transmit the DO pilot, cycling through with each timeslot and across the anchor carrier and extended carrier(s) used for MC-DO transmission. In essence, MIMO is used to transmit the forward traffic channel. In this arrangement, the same data can be sent out of the two different antennas for diversity purposes. As another embodiment, each antenna can send different data, thereby increasing system throughput.

Figure 12:
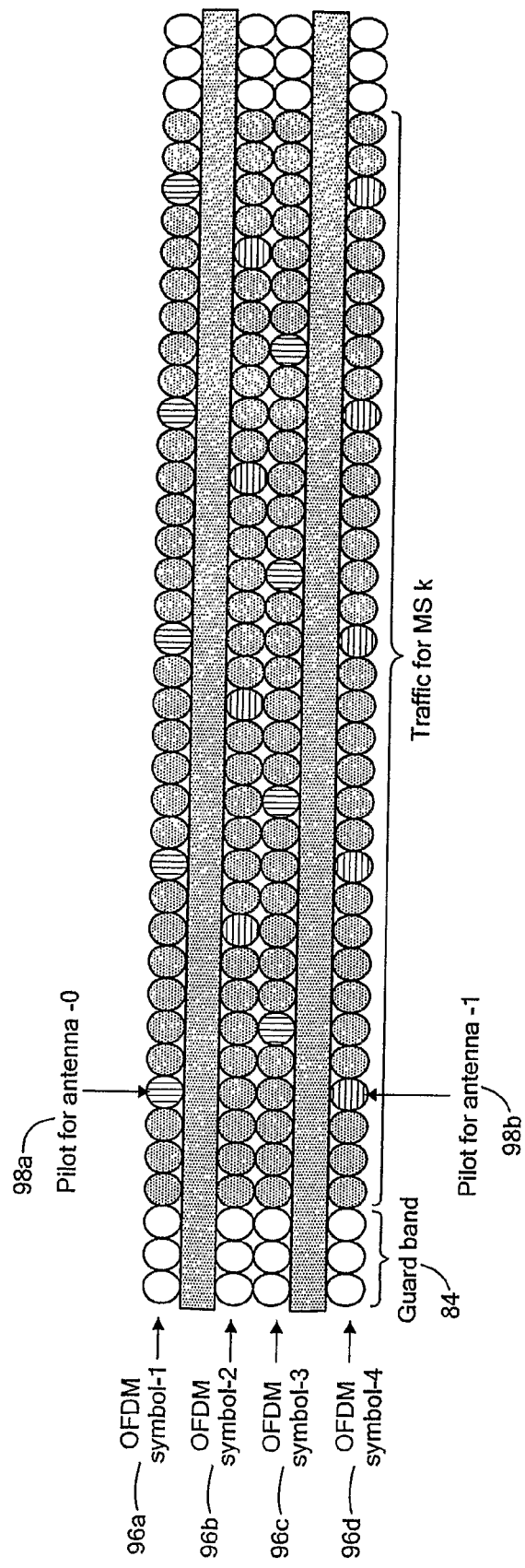
FIG. 12 is a frequency structure diagram of the forward link including support for MIMO-OFDM in connection with B-OFDM.

MIMO on the forward link in connection with B-OFDM is described with reference to FIG. 12. In this embodiment, space time spreading is used to transmit the auxiliary MAC channel. Antenna switching is used to transmit the B-OFDM pilot using frequency domain orthogonal pilots. MIMO is used to transmit the forward traffic channel in the frequency domain. FIG. 12 shows four symbols, designated symbols 96a, 96b, 92c and 96d. Because two antennas are used, pilots for each antenna must be provided. The pilot tones for antenna 0 are shown as circles with vertical stripes and designated pilot tones 98a. Pilots for antenna 1, designated as pilot tones 98b are shown as pilot tone circles with horizontal stripes. The embodiment in FIG. 12 shows traffic for a single mobile station k, it being understood that the other embodiments described above with respect to traffic distribution among pilot tones for one or more users is applicable.

Short Pilot Symbols

Figure 13:
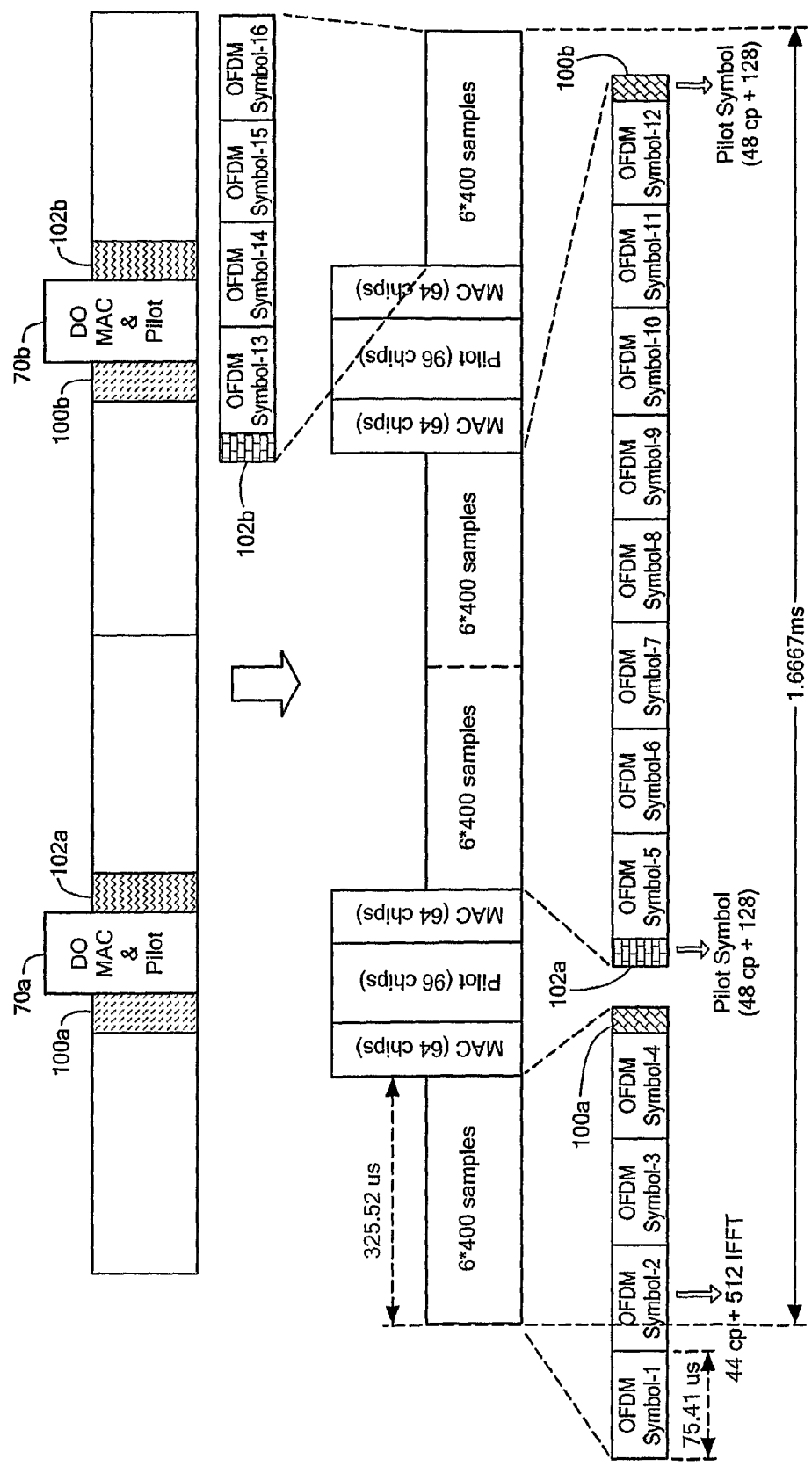
FIG. 13 is a diagram of a time slot showing an arrangement supporting short pilot symbols.

In accordance with another aspect of the present invention, a forward link pilot channel structure for use with a dual-mode 1x-DO and OFDM mobile station 26 is provided. Short pilot symbols that interleave with data symbols in a timeslot are provided. The short pilot symbols may also be interlaced with data symbols in each timeslot. Short pilot symbols, described with reference to FIG. 13 are formed by leftover cyclic prefix samples from data OFDM symbols. As is shown in FIG. 13, pilot symbol 100, comprised of portions 100a and 100b, is located just before DO MAC and pilot sections 70a and 70b. Pilot symbol 102, comprised of segments 102a and 102b, is located just after DO MAC and pilot 70. The specific examples of timeslot duration and symbol sizes are provided only for purposes of illustration, it being understood that the present invention is not limited to such.

The example shown in FIG. 13 assumes a 5 MHz bandwidth arrangement into which 16 data OFDM symbols and 4 short pilot symbols can be introduced into the 1x-DO slot structure. The arrangement, as noted above, can support the migration to B-OFDM. Using 5 MHz bandwidth as an example, a CDMA chip rate of 1.2288 MHz results in an OFDM sampling frequency (6x the chip rate) of 7.3728 MHz. In general, with respect to the short pilot symbol, as is shown in FIG. 13, the short pilot symbol can be located adjacent to the 1x-DO MAC channels. In the alternative, it is contemplated that the short pilot symbols can be provided at a different location within a timeslot.

For arrangements which use one transmit and one receive antenna ("SISO"), the 1x-DO TDM pilot channel can be reused for forward link channel estimation. For MIMO configurations, in accordance with one aspect, the 1x-DO TDM pilot channel can be reused for forward link channel estimation of one of the transmit antennas and the short pilot symbols can be used for channel estimation of the other transmit antennas. No further scatter pilots are required in this arrangement. In accordance with another aspect, the short pilot symbols can be used for channel estimation of all of the transmit antennas. In accordance with this aspect, no further scattered pilots are required.

The short pilot symbol is provided in the frequency domain as an orthogonal pattern which the interlaced pilot sub-carrier is assigned to the different antennas in a MIMO application or as a time domain orthogonal pattern in which the orthogonal sequence is assigned to different antennas in a MIMO implementation. These arrangements are described below.

In addition, it is contemplated that the short pilot symbol can be used to determine channel estimations for up to four transmit antennas or used to carry information in one of a number of embodiments. In accordance with a first embodiment, assuming two pilot symbols, each can be used as a common pilot. In accordance with another embodiment, the two pilot symbols can be used as private pilots. In accordance with a third aspect, one pilot symbol can be used as a common pilot and the second as a private pilot. In accordance with a fourth embodiment, one pilot symbol can be used to transmit a common pilot and the second pilot symbol can be used to transmit information. In accordance with a fifth embodiment, a pilot symbol can be used to transmit a private pilot and the other pilot symbol can be used to transmit information. Finally, in accordance with a sixth embodiment, both pilot symbols can be used to carry information.

Figure 14:
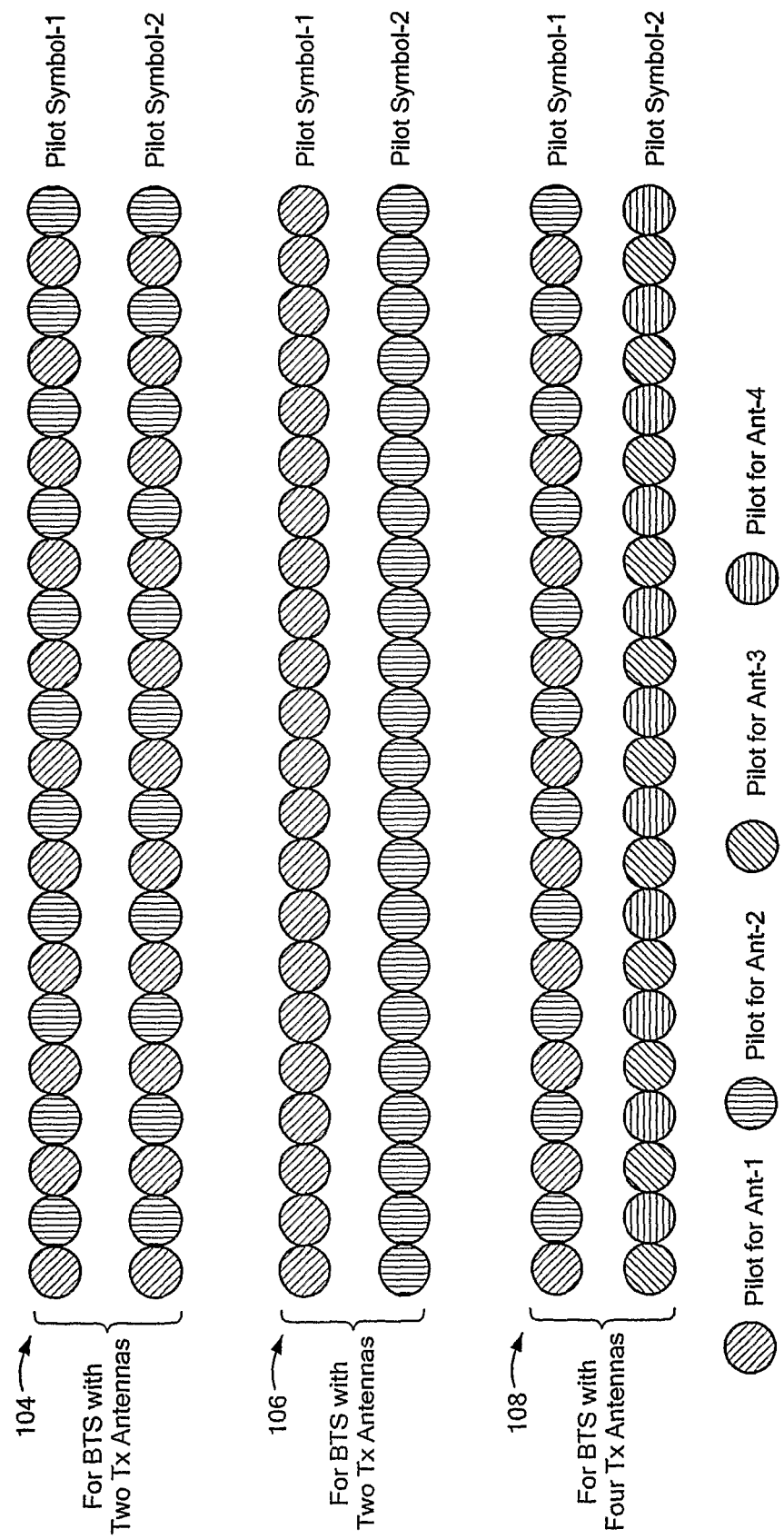
FIG. 14 is a diagram of an example of a common pilot arrangement using the short pilot symbol for a frequency domain orthogonal pattern.

As example of a common pilot arrangement using the short pilot symbol for a frequency domain orthogonal pattern is shown in FIG. 14. Pilot arrangement 104 shown in FIG. 14 shows that pilot symbol 1 and pilot symbol 2 are each transmitted in alternating fashion by two antennas in a two-antenna system. In short pilot arrangement 106, pilot symbol 1 is transmitted solely by antenna 1, while pilot symbol 2 is transmitted solely by antenna 2 in a two-antenna arrangement. Pilot symbol arrangement 108 for a BTS 24 having four antennas is shown as arrangement 108 in which pilot symbol 1 is transmitted in alternating fashion using antennas 1 and 2 while pilot symbol 2 is transmitted in alternating fashion between antennas 3 and 4. Of course, other arrangements for transmitting pilot symbols using two or more antennas are possible, and the arrangement shown is FIG. 14 is provided by way of example only. It is noted that the common pilot can be detected by all mobile stations 26 in the system. In addition, for pilot symbol arrangement 104, data via the second pilot symbol can be substituted with data transmission since antenna 1 can be used to transmit the interleaved pilot. The same is not the case with respect to pilot symbol arrangement 106 because the second antenna is used to transmit the pilot.

Figure 15:
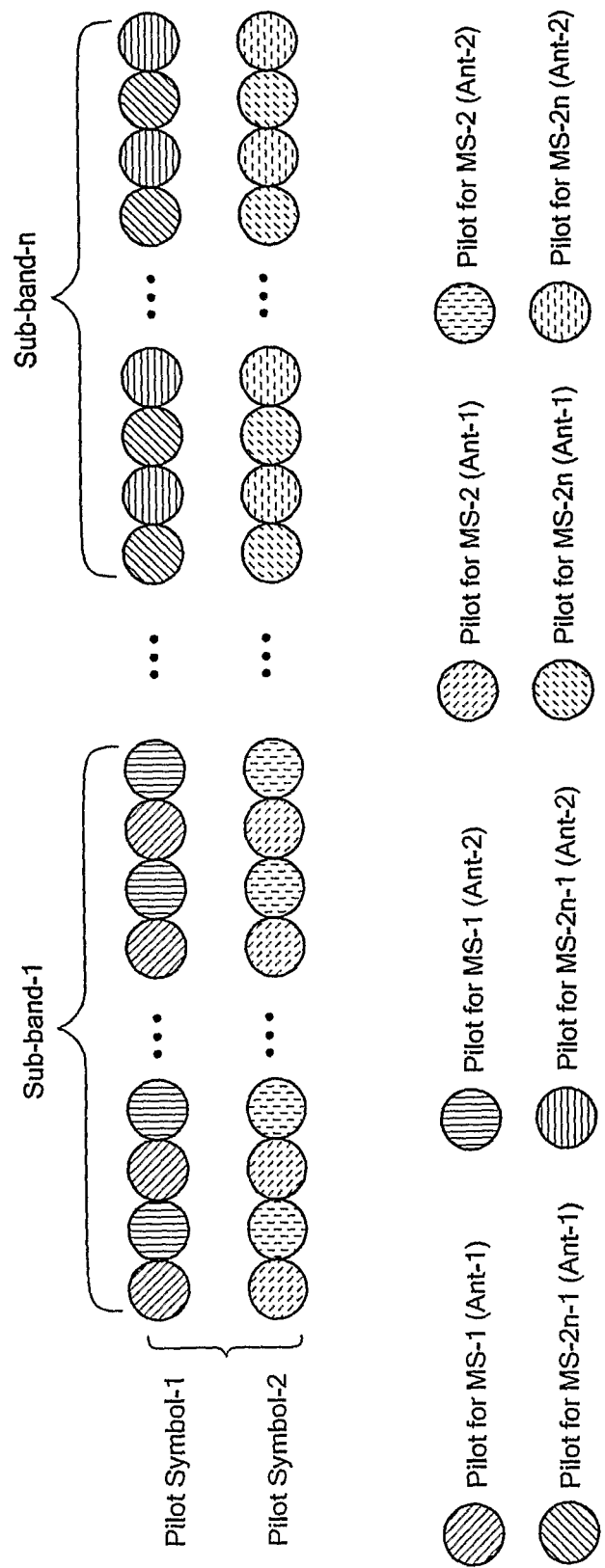
FIG. 15 is a diagram of another example of a common pilot arrangement using the short pilot symbol for a frequency domain orthogonal pattern.

FIG. 15 shows a private pilot arrangement using short pilot symbols for a frequency domain orthogonal pattern. Of note, this arrangement is used for a beam-formed pilot. The example shown in FIG. 15 is an example for two transmit antennas. Private pilot tones are used when the frequency domain is divided into "n" sub-bands where the contiguous data tones within each sub-band of a particular OFDM symbol are assigned to a specific MS 26.

As is shown in FIG. 15, pilot symbol 1 is used as the pilot for mobile station 1 which is subsequently alternately transmitted by antenna 1 and antenna 2, while sub-band n, pilot symbol 1 is used as the pilot for mobile station $2n-1$ in an alternating transmission arrangement between antenna 1 and antenna 2. Similarly, pilot symbol 2 is used for mobile station 2 and $2n$ and is transmitted in alternating fashion between antenna 1 and antenna 2.

Figure 16:
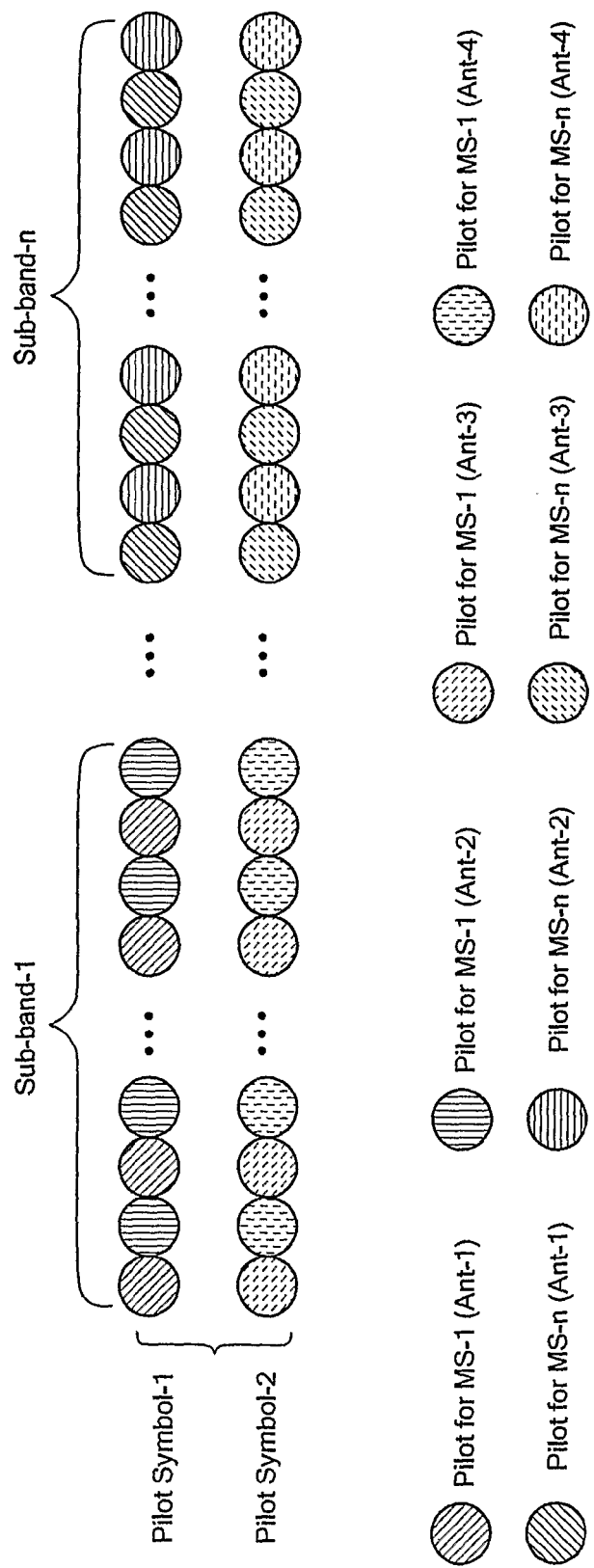
FIG. 16 is a an example of a private pilot arrangement using the short pilot symbol for a frequency domain orthogonal pattern.

FIG. 16 shows a diagram of private pilot arrangement for a short pilot symbol using a frequency domain orthogonal pattern. The example shown in FIG. 16 assumes four transmit antennas. In accordance with this arrangement, within each sub-band, two of the four antennas are used to transmit each pilot symbol. Of note, this arrangement is used for a beam formed pilot. In addition, although the arrangement shown in FIG. 16 shows two mobile stations, it is contemplated that any quantity of mobile stations can be supported subject to the capacity limitations of the system. Two mobile stations are shown here, solely for each of explanation.

It is noted that the B-OFDM time structure can be implemented such that pilot symbols rotate within different sectors or as supported on different BTSes 24. This is the case because different BTSes 24 cannot function properly if pilots collide, i.e., the pilots are provided in the same timeslot and frequency on BTSes 24 that are close together. Under such an arrangement, the short pilot symbols can be shifted so as to not be transmitted on the same part of the timeslot. A special sequence can be used on each transmit antenna to modulate the corresponding pilot sub-carriers to reduce the peak to average power ratio. In addition, power boost can be supported. Also, cyclic rotation of the short pilot symbols among neighboring sectors/BTSes 24 in each slot can improve channel estimation performance.

System Access and System Access Channel ("SACH")

The present invention provides a number of embodiments for supporting a SACH in the case where a timeslot is used for OFDM operation. The SACH provides instructions to an OFDM mobile station 26 as to how MS 26 accesses the system and how OFDM resources are assigned, e.g., MIMO or non-MIMO, which tones are assigned to which mobile station 26, etc.

In accordance with a first embodiment, dual mode (1x-DO and OFDM) mobile stations 26 are used. The 1x-DO pilot may be used for system access and CQI measurement. Under this embodiment, a MAC index in the 1x-DO MAC channel is used to indicate to OFDM mobile station 26 the presence of the SACH in a corresponding carrier. The data portion of the OFDM frame is used to provide the system access channel itself.

In accordance with another embodiment, a HARQ channel (timeslot) is reserved for OFDM transmission. A preamble which can be located at the beginning of the reserve slot can be periodically transmitted to support system access, CQI measurement and channel estimation. Typically four HARQ channels are used, so retransmission may occur every four timeslots. The other three HARQ channels can be dynamically shared between 1x-DO and OFDM. This allows the first HARQ channel to be reserved for OFDM transmission and the other three interleaved HARQ channels shared. In this arrangement, the sub-carrier assignments of the SACH for each carrier can be predetermined and/or changed by broadcast signaling within the network or the OFDM mobile station 26 can detect the SACH in each carrier blindly at the beginning of the three HARQ slots.

In accordance with another embodiment, a carrier can be reserved for OFDM and the SACH uses the preamble within that reserved carrier. In other words, a narrow-band preamble can be transmitted on a periodic basis on the reserved carrier to support B-OFDM MS system access. Under this arrangement, the SACH can be transmitted using the first OFDM symbol (or OFDM symbol pair in the OFDM-MIMO case) by the reserved carrier for every timeslot. Continual pilots can be used in the OFDM transmission to enable wideband CQI measurement.

Mixed Mode Operation

Implementations of the present invention may often lead to the need to simultaneously support multiple operational modes, such as 1x-DO, B-OFDM, and MC-DO. In other words, 1x-DO, MC-DO, B-OFDM can be flexibly multiplexed on different carriers and the multiplexing arrangement changed from one timeslot to another. Three examples of mixed mode operation are shown and described with respect to FIG. 17. Mixed 1x-DO/MC-DO mode 110 shows that, at both slots k and k+1, 1x-DO or MC-DO can occupy all three carriers. In mixed mode 112, 1x-DO and/or MC-DO occupies all three carriers within slot k, while at slot k+1, the B-OFDM occupies all three carriers. It is noted that 1x-DO and MC-DO can share the available carriers within timeslot k and both the time and frequency domains. For example, 1x-DO can occupy carrier 1 while MC-DO can be used on carriers 2 and 3. As another example, 1x-DO can occupy carrier 1 while MC-DO can still be used on carriers 1, 2 and 3, depending on the capabilities of mobile stations 26 within the supported region.

Mixed mode 114 shows that at slot k 1x-DO and/or MC-DO occupy all three carriers. Various arrangements are the same as that in mode 112 with respect to slot k. At slot k+1 in mixed mode 114, 1x-DO and/or MC-DO occupy one carrier, while B-OFDM occupies the other two carriers. It is noted that the carriers occupied by the 1x-DO/MC-DO portions and the B-OFDM portions can be non-contiguous. For example, 1x-DO/MC-DO can occupy carrier 1 while B-OFDM can be implemented on carriers 0 and 2. Additional aspects of each of modes 110, 112 and 114 are described below.

Operation of a 1x-DO mobile station 26, i.e., a legacy 1x-DO mobile station 26, in accordance with any of modes 110, 112 and 114 are described as follows. Initially, mobile station 26 logs on to the system using the anchor carrier, e.g., anchor carrier 34. Mobile station 26 might receive instructions via anchor carrier 34 redirecting the mobile station 26 to operate on an extended carrier, such as extended carrier 36 once mobile station 26 has been admitted to the call. In other words mobile station 26 receives instructions indicating that the active call session itself will occur via an extended carrier. Mobile station 26 tunes to the extended carrier. In this mode, no carrier scheduling is involved. Because the operation of a legacy 1x-DO mobile station 26 is not dynamic, BTS 24 only performs carrier load balancing during call admission. Mobile station 26 stays on the assigned carrier for the duration of the call.

A mobile station 26 operating in an MC-DO environment for any of modes 110, 112 and 114 is now explained. Initially, as with legacy 1x-DO mobile stations, MC-DO mobile station 26 logs into the system using the anchor carrier, such as anchor carrier 34. However, unlike legacy 1x-DO operation, BTS 24 dynamically assigns the number of carriers to be used in a manner which can vary from one timeslot to another. Such a determination can be made by service type and QoS. In other words, MC-DO mobile station 26 within an active call can switch operation among carriers from slot to slot, and can change the number of carriers as well as the amount of bandwidth. By allowing per-slot dynamic allocation of carriers, BTS 24 can support varied scheduling with respect to MC-DO mobile stations 26.

It is also contemplated that the present invention can support MC-DO mobile stations 26 for broadcast multicast-based systems using narrow-band OFDM, e.g. 1.25 MHz carrier. One of the carriers is used for the broadcast multicast-based system. Deterministic carrier hopping is used across the network to improve the broadcast multicast-based system diversity and performance. The broadcast multicast-based system carrier can be DO-based or extended into the B-OFDM wave form. Multiple carriers can be simultaneously demodulated. Within a carrier, transmission can be switched from slot to slot.

Figure 17:
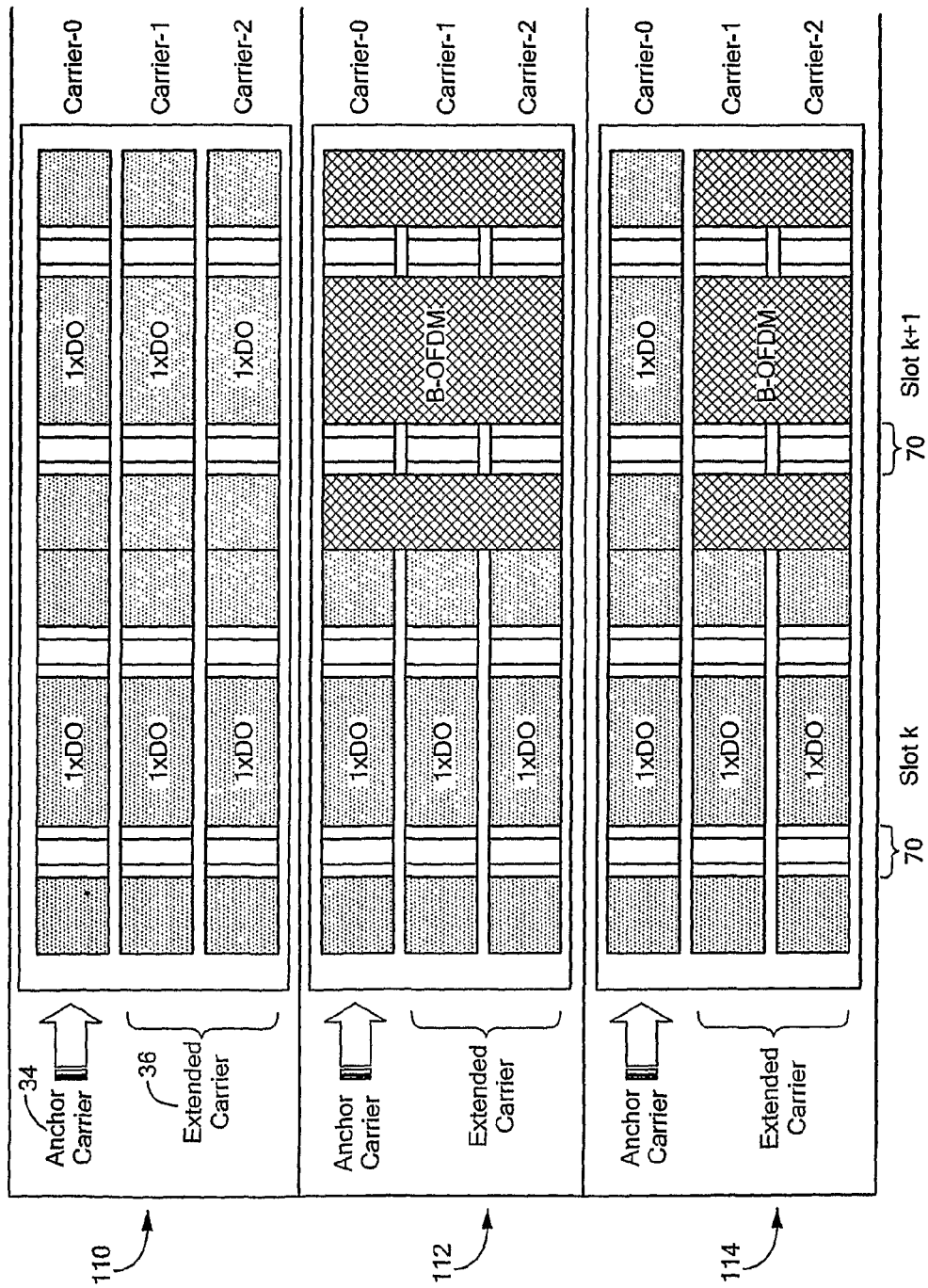
FIG. 17 is a diagram showing a carrier arrangement used to support mixed mode operation.

Operation of a mobile station 26 in a mixed B-OFDM and 1x-DO mode, such as mode 112 in FIG. 17, is now explained. As is shown in FIG. 17, B-OFDM occupies the entire bandwidth. A particular timeslot, such as slot k+1, is assigned in a fixed manner to a carrier supporting an existing 1x-DO system. In this embodiment, there is no dynamic 1x-DO carrier allocation on a per slot basis, and conventional 1x-DO and B-OFDM mobile stations 26 are in the network.

Mixed B-OFDM and 1x-DO operation is also shown in FIG. 17 as mode 114. Here, B-OFDM occupies the partial bandwidth available in a timeslot, such as is shown in slot k+1. 1x-DO operation is assigned in a fixed manner on the carrier used for existing 1x-DO operation, such as carrier 0 in slot k+1. In this arrangement, there is no dynamic 1x-DO carrier allocation on a per slot basis (because 1x-DO mobile stations 26 cannot support dynamic carrier allocation). As with mode 112, conventional 1x-DO and B-OFDM mobile stations 26 are present and supported in the network.

Modes 112 and 114 in FIG. 17 also support mixed B-OFDM and MC-DO operation. In this embodiment, B-OFDM can occupy the entire bandwidth in a timeslot, such as is shown in mode 112, or the partial bandwidth within a timeslot such as is shown in mode 114. When in this mode, a B-OFDM MS 26 demodulates the 1x-DO MAC to determine which carrier is allocated to it. Unlike 1x-DO operation, MC-DO mobile stations 26 can be scheduled dynamically on a per slot basis and using one or more carriers, as are explained above with respect to MC-DO operation in general. Here, the network can support 1x-DO, B-OFDM and MC-DO mobile stations 26, In another embodiment of the mixed B-OFDM and MC-DO operation, B-OFDM can occupy the entire bandwidth in a timeslot so that the B-OFDM mobile station 26 does not need to demodulate the 1x-DO MAC. The B-OFDM MS 26 demodulates the extended B-OFDM symbol as shown in FIG. 10. In such a case, the B-OFDM MS 26 can use the auxiliary MAC channel. MC-DO can be scheduled dynamically or on a per slot basis by detecting a valid 1x-DO MAC such as shown in modes 110, 112 and 114 in slot k and explained above with respect to MC-DO operation.

A B-OFDM mobile station 26 can operate in a B-OFDM-only mode and, of course, system 10 can be arranged to support B-OFDM operation. In B-OFDM-only mode, B-OFDM occupies the entire bandwidth and timeslot. Referring to FIG. 17, such operation would replace, for example, the 1x-DO carriers shown in mode 112 in slot k and would not include 1x-DO MAC and pilot block 70. In this arrangement, because the entire system is a B-OFDM system, B-OFDM can use the auxiliary MAC channel, and the extended B-OFDM symbol, shown as block 94 in FIG. 10, can be demodulated and interpreted by MS 26.

Forward Link Architecture

Figure 18:
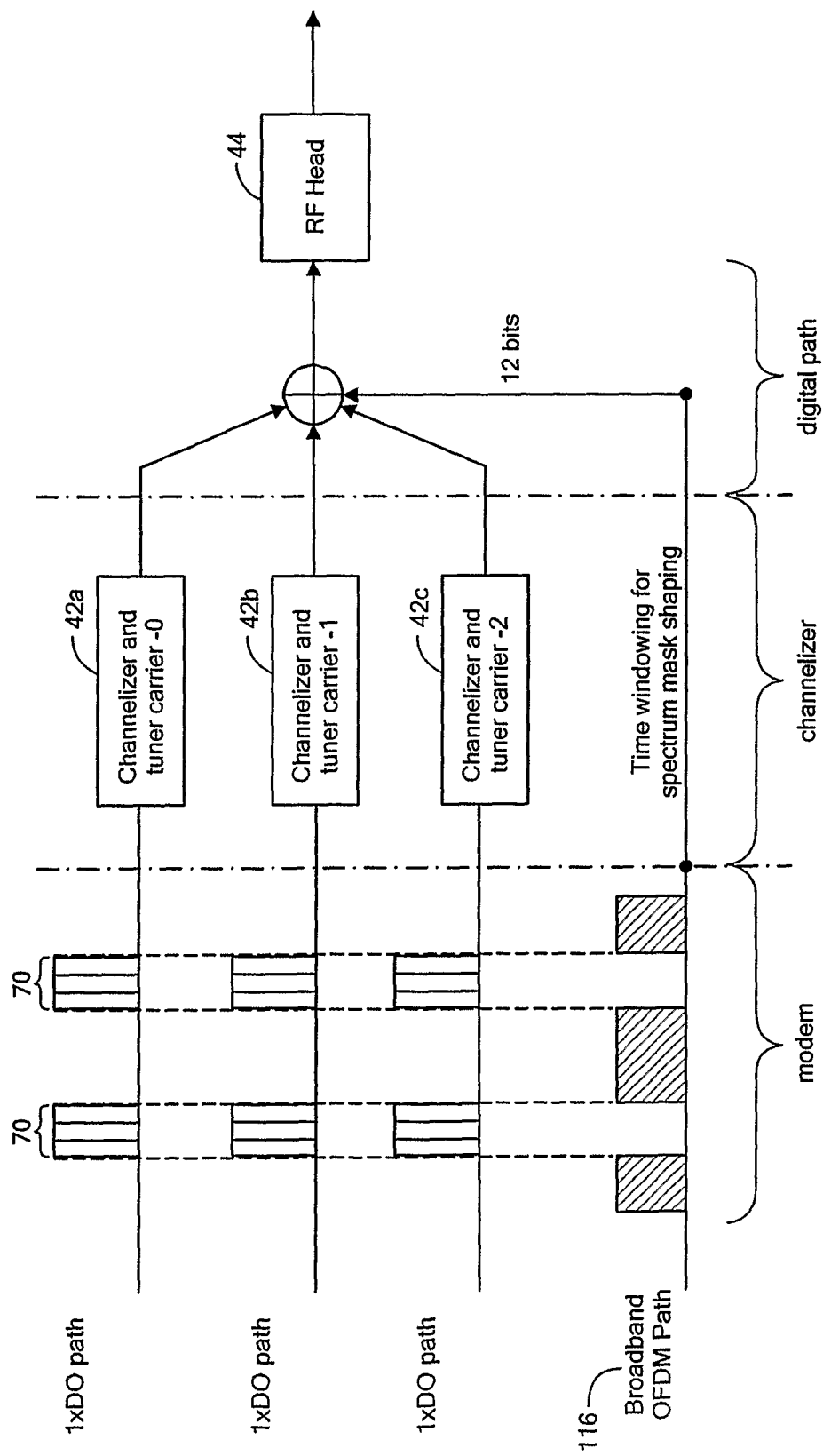
FIG. 18 is a block diagram of a BTS architecture used for mixed mode forward link transmission.
Figure 19:
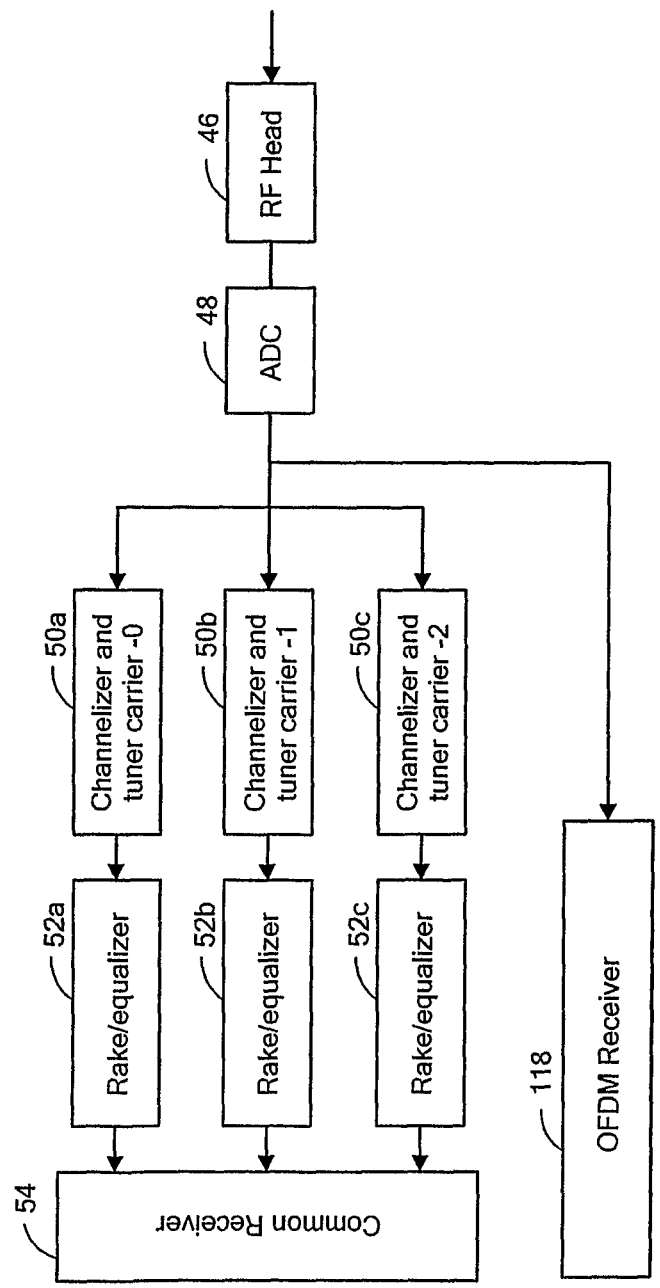
FIG. 19 is a block diagram of a mobile station architecture used for mixed more forward link reception.

FIGS. 18 and 19 show an exemplary BTS 24 architecture and MS 26 architecture, respectively, for forward link communications in accordance with the present invention where the MAC and pilot are 1x-DO (such as MAC in pilot block 70 in FIG. 17), while the data is based on B-OFDM such as is shown modes 112 and 114, slot k+1, in FIG. 17. Of note, BTS 24 transmit architecture for mixed mode operation is similar to the BTS architecture shown in FIG. 3 with respect to MC-DO operation. Because BTS 24 includes B-OFDM path 116, BTS 24 includes provisions for modulating the B-OFDM data and provides time windowing for spectrum mask shaping. The resultant 12-bit samples are summed with channelizers and tuners 42 for the various carriers and provided to RF head 44 for transmission.

The receiver end at MS 26 for a mixed mode environment is shown in FIG. 19. The architecture of MS 26 in a mixed mode environment is quite similar to that shown in FIG. 4 with respect to a MC-DO environment with the addition of OFDM receiver 118 to receive the B-OFDM data once it is converted to a digital format by ADC 48.

Reverse Link Operation

Operation of 1x-DO Mobile Station

FIG. 2 shows the timeslot and carrier arrangement for 1x-DO and MC-DO reverse link operation. For mobile stations 26 that support legacy 1x-DO operation, as is noted above with respect forward link operation, MS 26 logs into the system using anchor carrier 38. BTS 24 can instruct MS 26 to tune to one of extended carriers 40. In legacy 1x-DO operation, no carrier scheduling is involved, and scheduling by BTS 24 is done only at the time of carrier assignment based on carrier load balancing.

Mixed Mode Operation with Power Control

Migration from 1x-DO environments to MC-DO and B-OFDM environments inherently necessitates support for mixed mode operation in which there are legacy 1x-DO mobile stations 26 and MC-DO and/or B-OFDM mobile stations 26. The result is that power control for legacy 1x-DO and MC-DO and/or B-OFDM mobile stations 26 must be provided in a manner which does not cause one type of mobile station to interfere with another.

The present invention contemplates power control overlay for mixed mode operation and is described with reference to FIGS. 20 and 21. FIG. 20 is a power control overlay diagram for 1x-DO and MC-DO mobile stations 26 (for reverse link operation). MC-DO operation is shown as "3x-DO" overlay 120 across anchor carrier 38 and two extended carriers 40. Power control for the underlying 1x-DO carriers follows known power control methodologies.

For MC-DO operation, a 3x direct spread can be used in the reverse link in which three carriers are used together, e.g., a single carrier spans the three carrier frequency range. Power control for the 3x direct spread is applied rather than on a per 1x-DO basis using the same methodology as would be used for a single 1x-DO channel. Power control overlay in a B-OFDM environment is explained with reference to FIG. 21 which shows a diagram including B-OFDM power control overlay 122. Timing structure for reverse link B-OFDM operation is the same as discussed above with respect to forward link timing for OFDM operation. As discussed above, because no pilot and MAC are used in reverse link operation for B-OFDM, extended symbols can be used. Similarly, the reverse link frequency structure for B-OFDM operation is the same as discussed above with respect to forward link operation. In B-OFDM mode, the 1x-DO structure is mapped into the extended OFDM symbol (see block 94 in FIG. 10). The reverse link pilot is mapped into the scatter pilot with power boost, and the same power control method is used for the B-OFDM mobile station 26 as with the underlying 1x-DO mobile stations 26. Legacy mobile stations 26 supporting only 1x-DO operation in the underlying portion of the network follow known 1x-DO operating methodologies.

It is also contemplated that each timeslot can include 1 head extended symbol and 20 OFDM symbols in which the head symbol and regular symbols use the same FFT sizes but different cyclic prefixes, e.g., three more samples in the head symbol compared with the regular OFDM symbols. The head symbol can also be used as a random access channel.

Mixed Mode Operation with Burst

Mixed mode with burst operation is described with reference to FIGS. 22 and 23. As is seen in FIGS. 22 and 23, power control is not needed because 1x-DO is relegated to anchor carrier 38 while MC-DO, shown as two contiguous carrier block 124 in FIG. 22 and B-OFDM operation shown as contiguous frequency block 126 in FIG. 23, operate within extended carriers 40.

Figure 22:
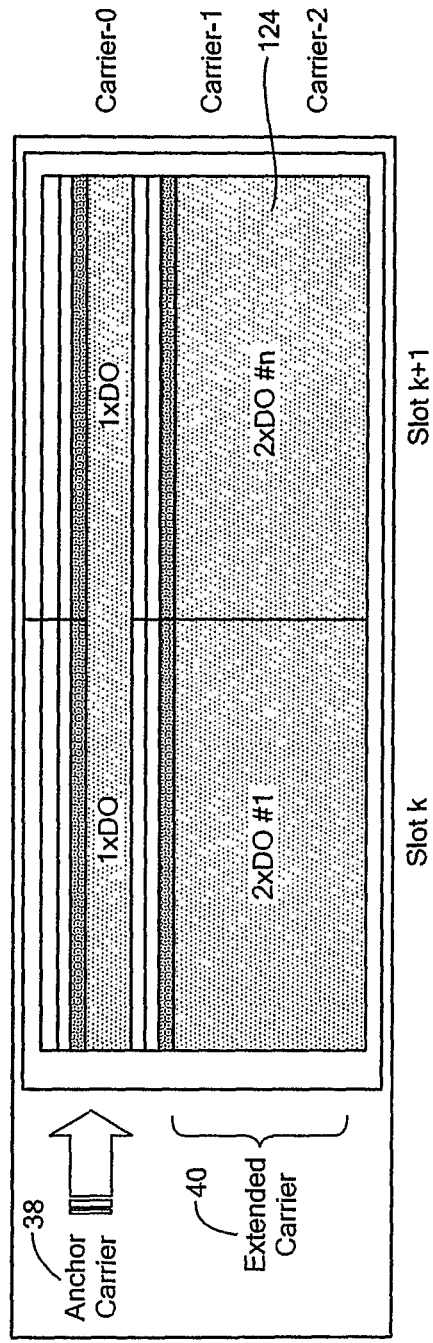
FIG. 22 is a diagram of a carrier arrangement supporting mixed mode operation with burst.

In the MC-DO first mode example shown in FIG. 22, MC-DO mobile station 26 can use extended carriers 40 to burst at a high data rate because 1x-DO operation is confined to anchor carrier 38. This arrangement allows MC-DO mobile station 26 to operate with 1x and 2x direct spreading of carriers, while retaining the same channel structure as 1x-DO. TDM bursting on extended carriers 40 is accomplished based on scheduling. Of note, burst mode operation as shown in FIG. 22 can be mixed with power control overlay operation as shown in FIG. 20. For example, anchor carrier 30 and one extended carrier 40 can be used for power control and the other extended carrier, e.g., carrier-two, can be used for burst mode operation.

Figure 23:
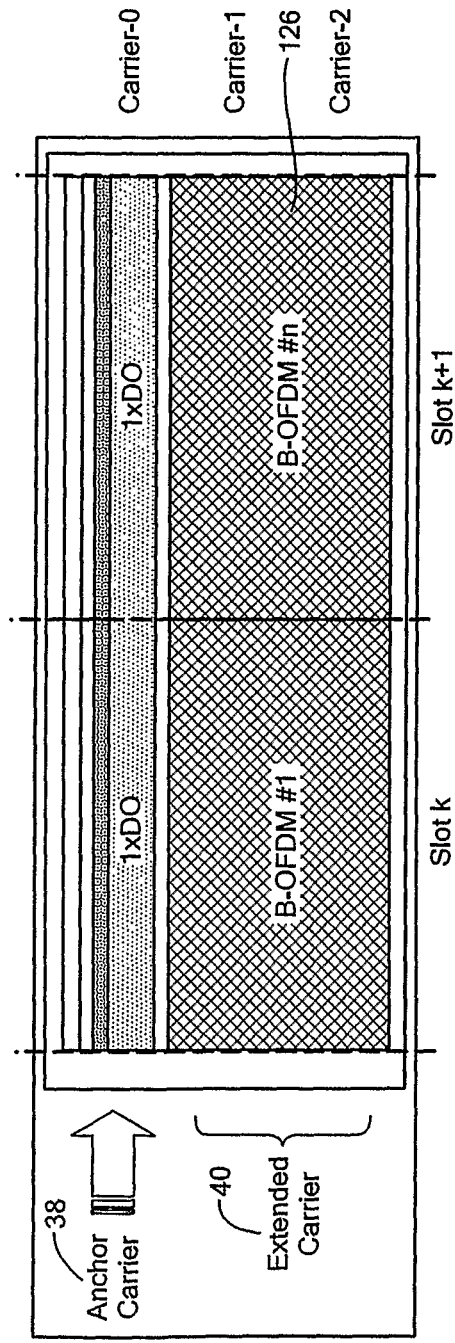
FIG. 23 is a diagram of an alternate carrier arrangement supporting mixed mode operation with burst.

As shown in FIG. 23, B-OFDM mobile stations 26 can also operate with burst mode in reverse link operation that also supports 1x-DO mobile stations 26. Legacy 1x-DO mobile stations 26 operate in anchor carrier 38 and follow traditional 1x-DO operation. B-OFDM mobile stations 26 operate using the same timing and frequency structures as discussed above with respect to forward link operation. The reverse link pilot is mapped into the scatter pilot with power boost. TDM bursting for B-OFDM mobile stations 26 is permitted on extended carriers 40 based on scheduling. As with MC-DO, mixed mode 1x-DO and B-OFDM burst mode operation can be mixed with power control overlay in a manner similar to that described above with respect to MC-DO mixed operation. It is also noted that mixed mode operation that includes both integrated power control and burst mode can be done on a per-slot basis for both MC-DO and B-OFDM mobile stations 26. For example, MC-DO operation can be dynamically changed between power control operation and burst operation on a slot-to-slot basis. Similarly, B-OFDM operation can be dynamically changed between power control operation and burst operation on a slot-to-slot basis.

Reverse Link Architecture

Figure 24:
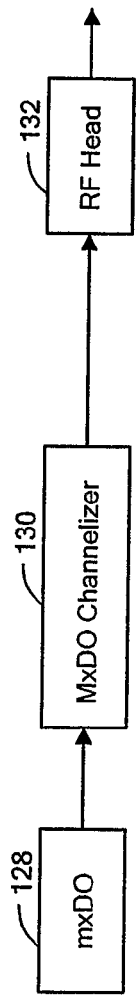
FIG. 24 is a block diagram of the transmitter architecture of a 1x-DO and/or MC-DO mobile station.
Figure 25:
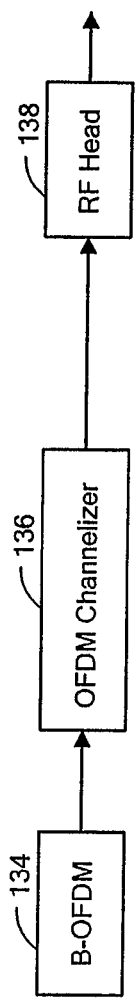
FIG. 25 is a block diagram of the transmitter architecture of a B-OFDM mobile station.
Figure 26:
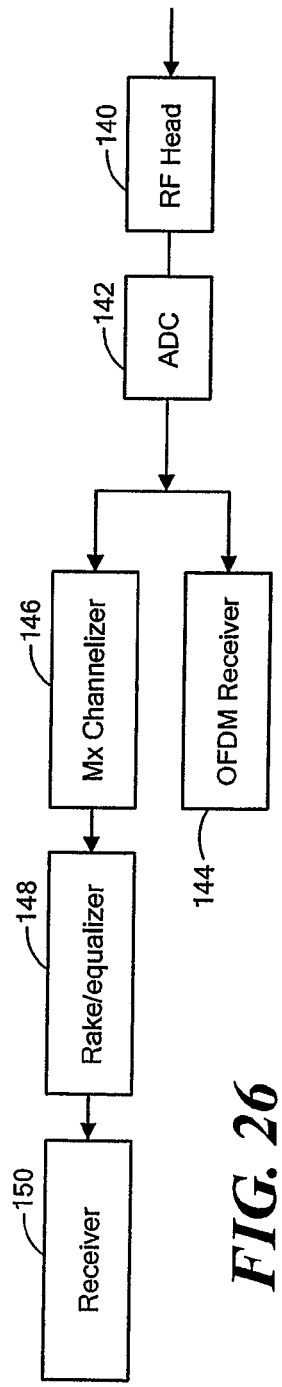
FIG. 26 is a block diagram of the receiver architecture of a BTS.

A reverse link architecture for mobile stations 26 and BTS 24 constructed in accordance with the principles of the present invention is described with reference to FIGS. 24-26 where FIG. 24 is a block diagram of the transmitter architecture of a 1x-DO and/or MC-DO mobile station 26, FIG. 25 is a block diagram of the transmitter architecture of a B-OFDM mobile station 26, and FIG. 26 is a block diagram of the receiver architecture of a BTS 24. Referring first to FIG. 24, 1x-DO or MC-DO structured stream, shown as mx-DO block 128 where "m" refers to the number of carriers. The mx-DO stream is sent to mx-DO channelizer 130 and then to RF head 132 for transmission to BTS 24.

The transmitter architecture of a B-OFDM mobile station 26 is shown in FIG. 24 where B-OFDM stream 134 is channelized by OFDM channelizer 136 and sent to RF head 138 for transmission to BTS 24. On the receiving end, as is shown in FIG. 25, BTS 24 includes RF head 140 which passes the received signal to ADC 142 for conversion to a digital format. From there, OFDM receiver 144 processes the OFDM stream while mx-DO channelizer 146, rake/equalizer 148, and receiver 150 process mx-DO data. In sum, BTS 24 is capable of receiving and processing 1x-DO, MC-DO and B-OFDM transmissions from mobile stations 26.

MIMO-OFDM

The present invention provides two approaches for supporting MIMO-OFDM on the reverse link. The first approach is use of a mobile station 26 that supports true MIMO-OFDM operation as is known in the art, e.g., two transmit antennas that transmit the same tone and same OFDM symbol. As a result, the same physical layer resource allows for doubling the throughput or for providing transmission diversity.

The second approach is to use "virtual" MIMO-OFDM transmission using multiple mobile stations 26. Virtual MIMO operation is described in U.S. patent application Ser. No. 10/321,999, filed Dec. 16, 2002, entitled, VIRTUAL MIMO COMMUNICATION SYSTEM, the entire contents of which are incorporated herein by reference. Virtual MIMO operation uses separate mobile stations 26 in which each mobile station 26 has one antenna, but the multiple stations transmit at the same time. As with the traditional MIMO operation, BTS 24 has multiple, e.g., two, receive antennas. Virtual MIMO operation uses the same OFDM symbol and tone, but the mobile stations 26 are spatially separated. It is contemplated that virtual MIMO operation can use up to four separate mobile stations 26 and up to four separate receive antennas on BTS 24. In other words, four separate mobile stations 26 can be used to create a virtual MIMO environment.

In virtual MIMO-OFDM operation, each mobile station 26 transmits on a different B-OFDM pilot where the pilots are orthogonal in the frequency domain. Each mobile station 26 transmits the forward traffic channel in the frequency domain as it would using SISO transmission. Two or more SISO mobile stations 26 collaborate their transmissions on the OFDM resources to form a spatially multiplexed transmission on the reverse link. This arrangement, like traditional MIMO-OFDM, allows increased reverse link capacity proportional to the number of collaborative mobile stations 26.

Figure 27:
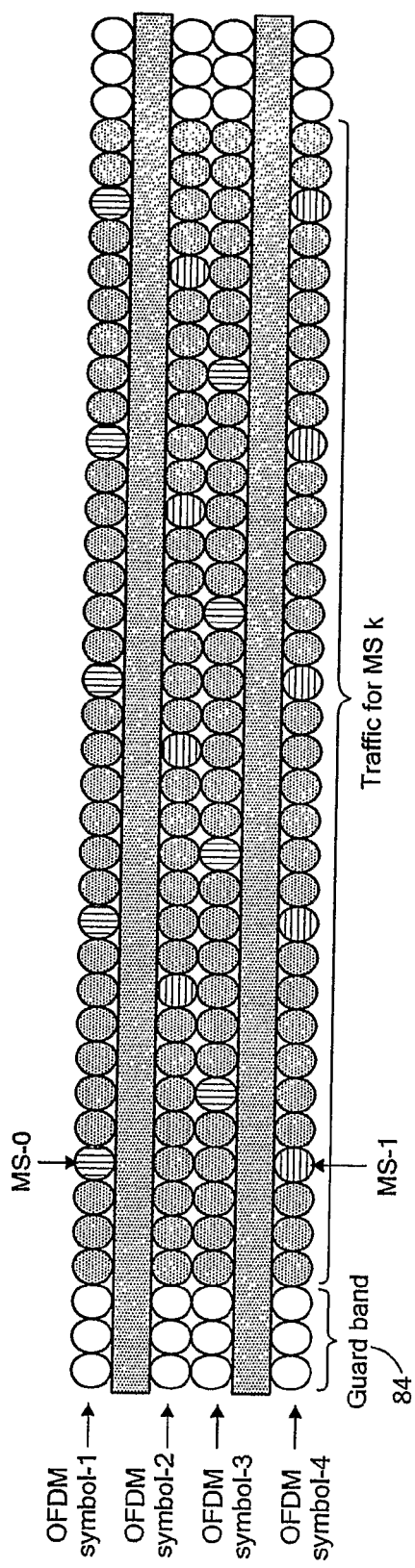
FIG. 27 is a frequency structure diagram for reverse link virtual MIMO-OFDM operation.

Traditional MIMO-OFDM operation in the reverse link uses a frequency structure which is the same as described above with respect to forward link operation in FIG. 12. As is shown in FIG. 27, the frequency structure for reverse link virtual MIMO-OFDM operation is similar to that shown in FIG. 12, with the exception that the pilot tones are transmitted by separate mobile stations 26, e.g., MS-0 and MS-1, instead of simply using separate antennas.

Reverse Link Pilot Channel Structure

Figure 28:
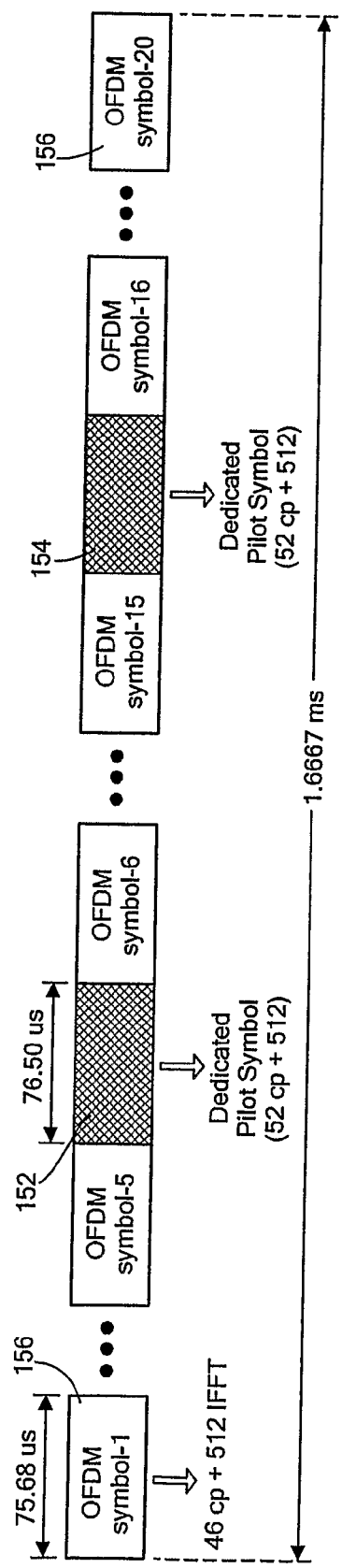
FIG. 28 is a diagram of a time slot arrangement having dedicated pilot symbols incorporated into a 1x-DO slot structure.
Figure 29:
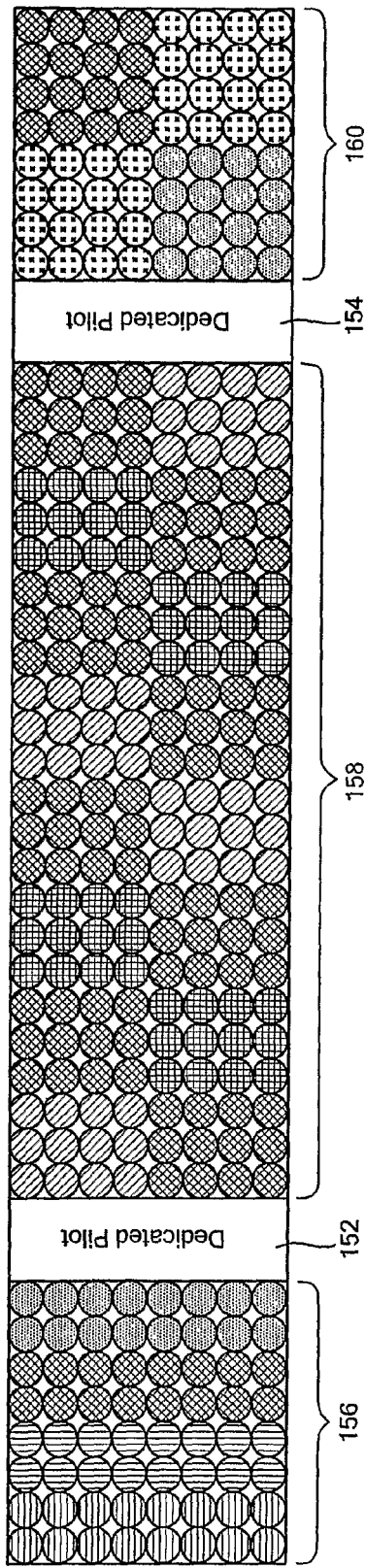
FIG. 29 is a zone assignment diagram.

The present invention provides a reverse link pilot channel structure for single mode B-OFDM mobile stations 26 or dual mode (1x-DO and B-OFDM) mobile stations 26. This feature is described with reference to FIGS. 28-30. As is shown in FIG. 28, dedicated pilot symbols 152 and 154 are incorporated into the 1x-DO slot structure (see B-OFDM time structure 72 in FIG. 6). Dedicated pilot symbols 152 and 154 can be used for reverse link channel sounding as well as reverse link fast or slow power control.

Dedicated pilot symbols 152 and 154 can be shared among multiple mobile stations 26 in the frequency and/or time domain. This can be done by interlacing the pilot sub-carriers of different mobile stations 26 within the same pilot symbol. With respect to frequency domain sounding, different frequency domain pseudo random codes (Golay sequences) may be used by different mobile stations 26 for sounding. With respect to time domain sounding, different time domain pseudo random codes (Golay sequences) are used by different mobile stations 26 for sounding. Cyclic rotated versions of the time domain pseudo random code can be used to differentiate different antennas from the same mobile station 26. As is shown in FIG. 28, mobile station 26 transmits the dedicated pilot symbols 152 and 154 every timeslot or every x timeslot, where x is configurable by BTS 24. The arrangement in FIG. 28 shows dedicated pilot symbol 152 located after OFDM symbol 5, while dedicated pilot symbol 154 is located after OFDM symbol 15. FIG. 28 shows the use of 20 data OFDM symbols 156, in addition to dedicated pilot symbols 152 and 154. This arrangement uses the same sampling frequency as the forward link.

The present invention also provides a way to implement a reverse link B-OFDM time structure with different zone assignments across the time domain within a timeslot. This feature is described with reference to FIG. 29. Within a timeslot, in addition to dedicated pilot symbols 152 and 154, the present invention provides contention and control zone 156, OFDM zone 158 and MC-CDMA (MC-CDMA is a term used for OFDM with spreading in frequency domain) zone 160. Contention and control zone 156 uses 1-D spreading in the frequency domain using random a sequence such as the Golay sequence does not support power control. OFDM zone 158 supports MIMO-OFDM, virtual MIMO, SDMA, localized FDMA and diversity and/or sub-band based B-OFDM. MC-CDMA zone 160 uses 2-D spreading in the frequency domain and supports both localized and interleaved FDMA. In another embodiment, the multiplexing of the contention and control zone, the OFDMA zone and the MC-CDMA zone can be in frequency domain or in both frequency and time domain.

Figure 30:
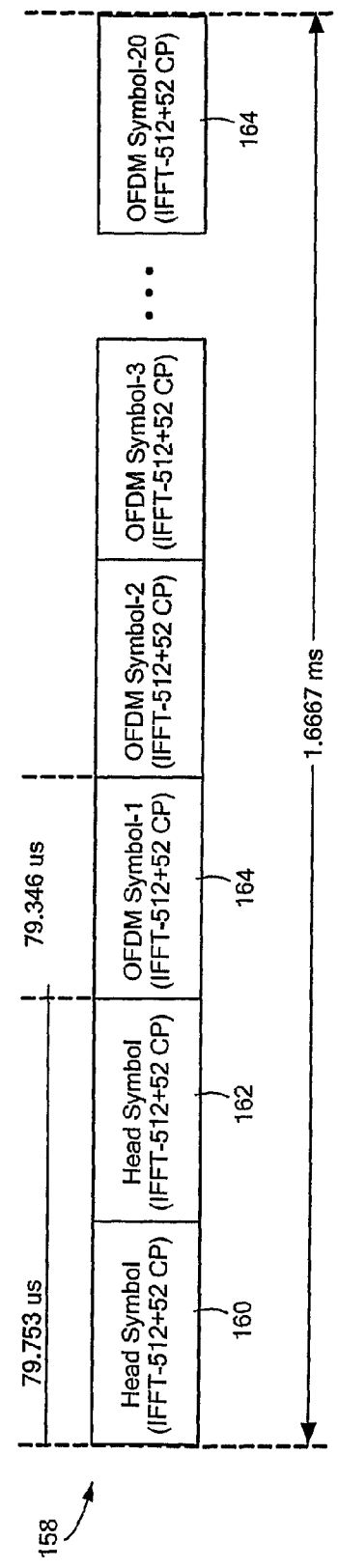
FIG. 30 is a diagram of an alternate time slot arrangement having dedicated pilot symbols incorporated into a 1x-DO slot structure.

FIG. 30 shows still another embodiment of a reverse link B-OFDM time structure constructed in accordance with the principles of the present invention. Timeslot 158 includes head symbols 160 and 162, and 20 regular OFDM symbols 164. Unlike the embodiment shown in FIG. 27 where the pilot symbol size differs from the regular OFDM symbol size (46 CP+512 IFFT for regular OFDM symbol 156 versus 52 CP+512 IFFT for dedicated pilot symbols 152 and 154), head symbols 160 and 162, and OFDM symbols 164 use the same FFT sizes. Head symbols 160 and 162 can be used as random access channels ("RACH").

Reverse Link Interference Management

Reverse link interference management is used to manage intra-cell interference for MC-CDMA operation and to manage inter-cell interference for both MC-CDMA and OFDM. In accordance with one embodiment, reverse link power control can be performed on a reverse link dedicated channel such as a dedicated pilot or dedicated feedback channel to maintain the required received signal-to-noise ratio. The traffic channel is transmitted with a certain traffic-to-pilot ("T/P") ratio power corresponding to the data rate. For the case of MC-CDMA, reverse link power control minimizes intra-cell and inter-cell interference. For the case of OFDM, reverse link power control minimizes inter-cell interference.

For the control of intra-cell interference and the control of received power at the serving BTS 24, a number of arrangements are provided in addition to the reverse link power control operation. First, an explicit grant method can be used where the serving BTS 24 assigns an explicit data rate (and/or data sub-carriers and symbols) to mobile station 26 through forward link rate assignment signaling. If BTS 24 only assigns data sub-carriers and symbols to mobile station 26, mobile station 26 deduces the allowable transmission data rate based on buffer occupancy, transmit power headroom and other factors. Second, a dedicated rate control can be used where a dedicated rate control bit is sent by the serving BTS 24 to each mobile station 26 to adjust the allowable data rate or T/P in an incremental or decremental fashion. Third, common rate control can be used where a common rate control bit is sent by the serving BTS 24 to all mobile stations 26 in its sector. In this case, each mobile station 26 adjusts its own allowable data rate or T/P in an incremental or decremental fashion.

Under this first embodiment, inter-cell interference control can be provided by a number of arrangements. First, a common rate control bit may be sent by each neighboring BTS 24. Mobile station 26 performs logical combining of the received commands, e.g., "OR-ing" of the down operation, from the neighbor BTS 24 in the mobile stations 26 active set, and adjusts the allowable data rate or T/P in an incremental or decremental fashion. Under a second arrangement, a dedicated rate control may be sent by each neighboring BTS 24 in the active set of the mobile station 26. Mobile station 26 may perform logical combining of the received commands from the neighbor BTS 24 in the active set of mobile station 26, and adjusts the allowable data rate or T/P in an incremental or decremental fashion.

With respect to overall interference control, at each transmission timeslot, mobile station 26 can decide on the overall allowable data rate or T/P based on the minimum of the allowable data rates or T/Ps from the intra-cell interference/power control and the inter-cell interference control. Common or dedicated rate control bit described above with respect to this embodiment may be applied to either a group of OFDM sub-carriers (sub-band) or all of the sub-carriers.

In accordance with the second embodiment, no continuous fast RL power control is required for each mobile station 26. In this case, the desired received signal-to-noise ratio is met through adaptive data rate assignment by the serving BTS 24 through HARQ and slow power adjustment. With respect to intra-cell interference control, intra-cell interference control is not required because this embodiment applies to OFDM and, in this case, there is no sharing of frequency sub-carriers among multiple mobile stations 26.

For inter-cell interference control, sub-carrier hopping can be performed to average out the interference across the entirety of the data sub-carriers. Two arrangements for using a neighboring BTS 24 to control the transmit power of mobile station 26 is provided. In accordance with a first arrangement, a common power/interference control bit is sent by each neighboring BTS 24. Mobile station 26 performs logical combining of the received commands from the neighbor BTS 24 in the mobile station's 26 active set, and adjusts the allowable transmit power in an incremental or decremental fashion. Under a second arrangement, a dedicated power control bit is sent by each neighboring BTS 24 that is within the active set of mobile station 26. Mobile station 26 can perform logical combining of the received commands from its active set BTS 24 and adjusts the allowable transmit power in an incremental or decremental fashion.

Based on the allowable transmit power adjusted through the inter-cell power/interference control operation, the actual transmit power can be adjusted through the intra-cell slow power adjustment operation and the data rate assigned by the serving BTS 24, while ensuring the actual transmit power is less than or equal to the allowable transmit power adjusted through the inter-cell power control operation. Mobile station 26 can determine the actual transmission data rate for each transmission timeslot.

The present invention advantageously provides a system and method for migrating from a first wireless networking technology, such as 1x-DO, to other wireless networking technologies, such as MC-DO, B-OFDM and MIMO-OFDM. Of course, the migration path is not relegated solely to starting with 1x-DO. The present invention also allows migration from MC-DO to the OFDM-based technologies. Operation in mixed environments, such as MC-DO/B-OFDM, is also provided by the present invention.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

We claim:

1. A method, comprising:
    transmitting data using frames based on a first wireless communication technology and a second wireless communication technology, wherein the first wireless communication technology is a 1x Data Optimized (1x-DO) communication technology, wherein the second wireless communication technology is a multiple-frequency communication technology, and wherein the transmitting is via a plurality of carriers including an anchor carrier and at least one extended carrier;
    selectively changing the transmitting on a frame-by-frame basis between the first and second wireless communication technologies and between the anchor carrier and at least one of the extended carriers, wherein the selectively changing includes transmitting a first frame via one of the anchor carrier and the at least one extended carrier and transmitting a second frame via the other one of the anchor carrier and the at least one extended carrier, and wherein the first frame is distinct from the second frame and includes different data than the second frame.

2. The method of claim 1, the method further comprising:
    multiplexing the first wireless communication technology and the second wireless communication technology on the plurality of carriers, the multiplexing varying from a first timeslot to a second timeslot, wherein the second wireless communication technology is a Broadband Orthogonal Frequency Division Multiplexing (B-OFDM) communication technology.

3. The method of claim 2, wherein the 1x-DO MAC indicates the presence of a system access channel, and wherein the plurality of carriers have a same timing structure.

4. The method of claim 2, wherein the B-OFDM communication technology includes a carrier, wherein the carrier is used to transmit a narrow-band preamble including a system access channel.

5. The method of claim 2, wherein a B-OFDM frame structure includes a Hybrid Automatic Repeat ReQuest (HARQ) channel, wherein the HARQ channel includes the system access channel, and wherein the plurality of carriers are assigned dynamically to a time slot.

6. The method of claim 2, wherein the B-OFDM communication technology and the 1x-DO communication technology use a same timing structure.

7. The method of claim 2, wherein a B-OFDM frame includes a plurality of Orthogonal Frequency Division Multiplexing (OFDM) blocks, the first OFDM block using the 1x-DO timing structure to have the 1x-DO MAC and pilot, and the remainder of OFDM blocks arranged to have a B-OFDM MAC and pilot.

8. The method of claim 7, wherein the OFDM blocks are arranged to have a B-OFDM MAC and pilot include an extended symbol.

9. The method of claim 7, wherein the B-OFDM pilot symbols include short pilot symbols introduced into the 1x-DO communication technology time structure.

10. The method of claim 1, the method further comprising:
    multiplexing the first wireless communication technology and the second wireless communication technology on the plurality of carriers, the multiplexing varying from a first timeslot to a second timeslot, wherein the second wireless communication technology is an Multi-Carrier Data Only (MC-DO) communication technology.

11. The method of claim 10, the method further comprising:
assigning one or more of the plurality of carriers to at least a part of an MC-DO communication session.

12. The method of claim 11, wherein access to the assigned carriers is provided on a timeslot basis, wherein the method further comprises assigning one or more timeslots for each assigned carrier to at least a part of an MC-DO communication session, wherein the plurality of carriers have a same timing structure.

13. The method of claim 1, the method further comprising:
multiplexing the first wireless communication technology and the second wireless communication technology on the plurality of carriers, the multiplexing varying from a first timeslot to a second timeslot, wherein the second wireless communication technology is a Multiple Input Multiple Output Orthogonal Frequency Division Multiplexing (MIMO-OFDM) communication technology.

14. The method of claim 13, wherein the MIMO-OFDM communication technology and the 1x-DO communication technology use a same timing structure.

15. A system, comprising:
a transmitter configured to transmit data using frames based on a first wireless communication technology and a second wireless communication technology, wherein the first wireless communication technology is a 1x Data Optimized (1x-DO) communication technology, wherein the second wireless communication technology is a multiple frequency communication technology, and wherein the transmitter is configured to transmit via a plurality of carriers including an anchor carrier and at least one extended carrier;
wherein the transmitter is configured to selectively change transmission on a frame-by-frame basis between the first and second wireless communication technologies and between the anchor carrier and at least one of the extended carriers, wherein transmitter is configured to selectively change transmission such that a first frame is transmittable via one of the anchor carrier and the at least one extended carrier and a second frame is transmittable via the other one of the anchor carrier and the at least one extended carrier, and wherein the first frame is distinct from the second frame and includes different data than the second frame.

16. The system of claim 15, wherein the system is a mobile station.

17. The system of claim 15, wherein the system is a Base Transceiver Station (BTS).

18. The system of claim 15, further comprising:
a multiplexer configured to perform multiplexing the first wireless communication technology and the second wireless communication technology on the plurality of carriers, the multiplexing varying from a first timeslot to a second timeslot;
wherein the second wireless communication technology is a Broadband Orthogonal Frequency Division Multiplexing (B-OFDM) communication technology.

19. The system of claim 18, wherein the B-OFDM communication technology includes a carrier, the carrier being used to transmit a narrow-band preamble comprising a system access channel.

20. The system of claim 18, wherein a B-OFDM frame includes a Hybrid Automatic Repeat ReQuest (HARQ) channel, wherein the HARQ channel includes the system access channel.

21. The system of claim 15, further comprising:
a multiplexer configured to perform multiplexing the first wireless communication technology and the second wireless communication technology on the plurality of carriers, the multiplexing varying from a first timeslot to a second timeslot;
wherein the second wireless communication technology is an Multi-Carrier Data Only (MC-DO) communication technology.

22. The system of claim 21, wherein the system is configured to assign one or more of the plurality of carriers to at least a part of an MC-DO communication session.

23. The system of claim 22, wherein access to the assigned carriers is provided on a time slot basis, wherein the system is configured to assign one or more timeslots for each assigned carrier to at least a part of an MC-DO communication session.

24. The system of claim 15, further comprising:
a multiplexer configured to perform multiplexing the first wireless communication technology and the second wireless communication technology on the plurality of carriers, the multiplexing varying from a first timeslot to a second timeslot;
wherein the second wireless communication technology is a Multiple Input Multiple Output Orthogonal Frequency Division Multiplexing (MIMO-OFDM) communication technology.

25. The system of claim 15, further comprising:
a multiplexer configured to perform multiplexing the first wireless communication technology and the second wireless communication technology on the plurality of carriers, the multiplexing varying from a first timeslot to a second timeslot;
wherein the second wireless communication technology is a B-OFDM communication technology.

26. The system of claim 25, wherein the B-OFDM communication technology and the 1x-DO communication technology use a same timing structure.

27. The system of claim 25, wherein a B-OFDM frame includes a plurality of Orthogonal Frequency Division Multiplexing (OFDM) blocks, the first OFDM block using the 1x-DO timing structure to have the 1x-DO MAC and pilot, and the remainder of OFDM blocks arranged to have a B-OFDM MAC and pilot.

28. The system of claim 27, wherein the OFDM blocks are arranged to have a B-OFDM MAC and pilot include an extended symbol.

29. The system of claim 27, wherein the B-OFDM pilot symbols include short pilot symbols introduced into the 1x-DO communication technology timeslot.

30. The system of claim 25, wherein the 1x-DO MAC indicates the presence of a system access channel, and wherein the plurality of carriers have a same timing structure.

31. The system of claim 15, wherein the second wireless communication technology is a Multiple Input Multiple Output Orthogonal Frequency Division Multiplexing (MIMO-OFDM) communication technology.

32. The system of claim 31, wherein the MIMO-OFDM communication technology and the 1x-DO communication technology use a same timing structure.

* * * * *

UNITED STATES PATENT AND TRADEMARK OFFICE
CERTIFICATE OF CORRECTION

PATENT NO. : 8,526,400 B2  
APPLICATION NO. : 11/816370  
DATED : September 3, 2013  
INVENTOR(S) : Wen Tong et al.

Page 1 of 1

It is certified that error appears in the above-identified patent and that said Letters Patent is hereby corrected as shown below:

In the Claims

In column 24, line 45 (claim 5), please delete "time slot" and insert --timeslot--.

In column 26, line 18 (claim 23), please delete "time slot" and insert --timeslot--.

Signed and Sealed this
Twenty-second Day of April, 2014

Michelle K. Lee
*Deputy Director of the United States Patent and Trademark Office*